(12) United States Patent
Arisada et al.

(10) Patent No.: US 10,331,292 B2
(45) Date of Patent: Jun. 25, 2019

(54) DISPLAY CONTROL METHOD, FIRST TERMINAL, AND STORAGE MEDIUM

(71) Applicant: LINE Corporation, Shibuya-ku, Tokyo (JP)

(72) Inventors: Hiroaki Arisada, Tokyo (JP); Tasuku Okuda, Tokyo (JP)

(73) Assignee: Line Corporation, Tokyo (JP)

( * ) Notice: Subject to any disclaimer, the term of this patent is extended or adjusted under 35 U.S.C. 154(b) by 488 days.

(21) Appl. No.: 15/084,923

(22) Filed: Mar. 30, 2016

(65) Prior Publication Data
US 2017/0177169 A1 Jun. 22, 2017

(30) Foreign Application Priority Data

Dec. 17, 2015 (JP) ................................. 2015-246590

(51) Int. Cl.
| | |
|---|---|
| G06F 3/0481 | (2013.01) |
| H04L 12/58 | (2006.01) |
| G06F 3/0486 | (2013.01) |
| G06F 3/0488 | (2013.01) |

(52) U.S. Cl.
CPC .......... *G06F 3/0481* (2013.01); *G06F 3/0486* (2013.01); *G06F 3/04883* (2013.01); *G06F 3/04886* (2013.01); *H04L 51/16* (2013.01); *H04L 51/32* (2013.01)

(58) Field of Classification Search
CPC .................................................. G06F 3/0481
USPC .......................................................... 715/752
See application file for complete search history.

(56) References Cited

U.S. PATENT DOCUMENTS

| | | | | |
|---|---|---|---|---|
| 7,549,924 | B2* | 6/2009 | Canessa ................... | A63F 13/12 463/40 |
| 7,856,469 | B2* | 12/2010 | Chen ....................... | H04L 51/04 709/203 |
| 8,862,672 | B2* | 10/2014 | Williams ............... | G06F 3/0481 709/205 |

(Continued)

FOREIGN PATENT DOCUMENTS

| | | |
|---|---|---|
| JP | 2014160467 A | 9/2014 |
| WO | WO-2014157148 A1 | 10/2014 |

OTHER PUBLICATIONS

Japanese Office Action dated Aug. 23, 2016, issued in corresponding Japanese Patent Application No. 2015-246590.

*Primary Examiner* — Reza Nabi
(74) *Attorney, Agent, or Firm* — Harness, Dickey & Pierce, P.L.C.

(57) ABSTRACT

A display control method performed by a first terminal of a first user is disclosed. The display control method includes receiving an instruction to display first talk information and second talk information on a screen of the first terminal; displaying, in a first display area of the screen, transmission data of a second user included in the first talk information; displaying, in a second display area of the screen, transmission data of a third user included in the second talk information; and displaying, in a third display area of the screen, transmission data of the first user included in the first talk information and in the second talk information. Pieces of the transmission data of the first to third users included in the first talk information and the second talk information are displayed and spatially arranged in the first to third display areas in a single time sequence.

9 Claims, 22 Drawing Sheets

(56) References Cited

U.S. PATENT DOCUMENTS

| | | | |
|---|---|---|---|
| 2004/0228531 A1* | 11/2004 | Fernandez | H04L 51/04 382/187 |
| 2009/0235184 A1* | 9/2009 | Perlson | G06Q 10/10 715/758 |
| 2011/0087540 A1* | 4/2011 | Krishnan | G06Q 30/02 705/14.43 |
| 2013/0054711 A1* | 2/2013 | Kessner | G06Q 10/107 709/206 |
| 2014/0237394 A1* | 8/2014 | Park | H04L 12/1822 715/758 |
| 2015/0295960 A1* | 10/2015 | Cholkar | H04L 65/1006 709/204 |
| 2016/0065529 A1* | 3/2016 | Katayama | G06F 3/0481 715/752 |
| 2016/0182423 A1* | 6/2016 | Tevosyan | H04L 51/16 715/752 |
| 2016/0259526 A1* | 9/2016 | Lee | G06F 3/04817 |
| 2017/0116161 A1* | 4/2017 | Stein | G06F 16/9535 |
| 2018/0188896 A1* | 7/2018 | Ghafourifar | G06F 17/2785 |
| 2018/0189017 A1* | 7/2018 | Ghafourifar | G06F 3/1454 |
| 2018/0270605 A1* | 9/2018 | Wang | H04L 51/04 |
| 2018/0295229 A1* | 10/2018 | Day, II | H04L 51/16 |

\* cited by examiner

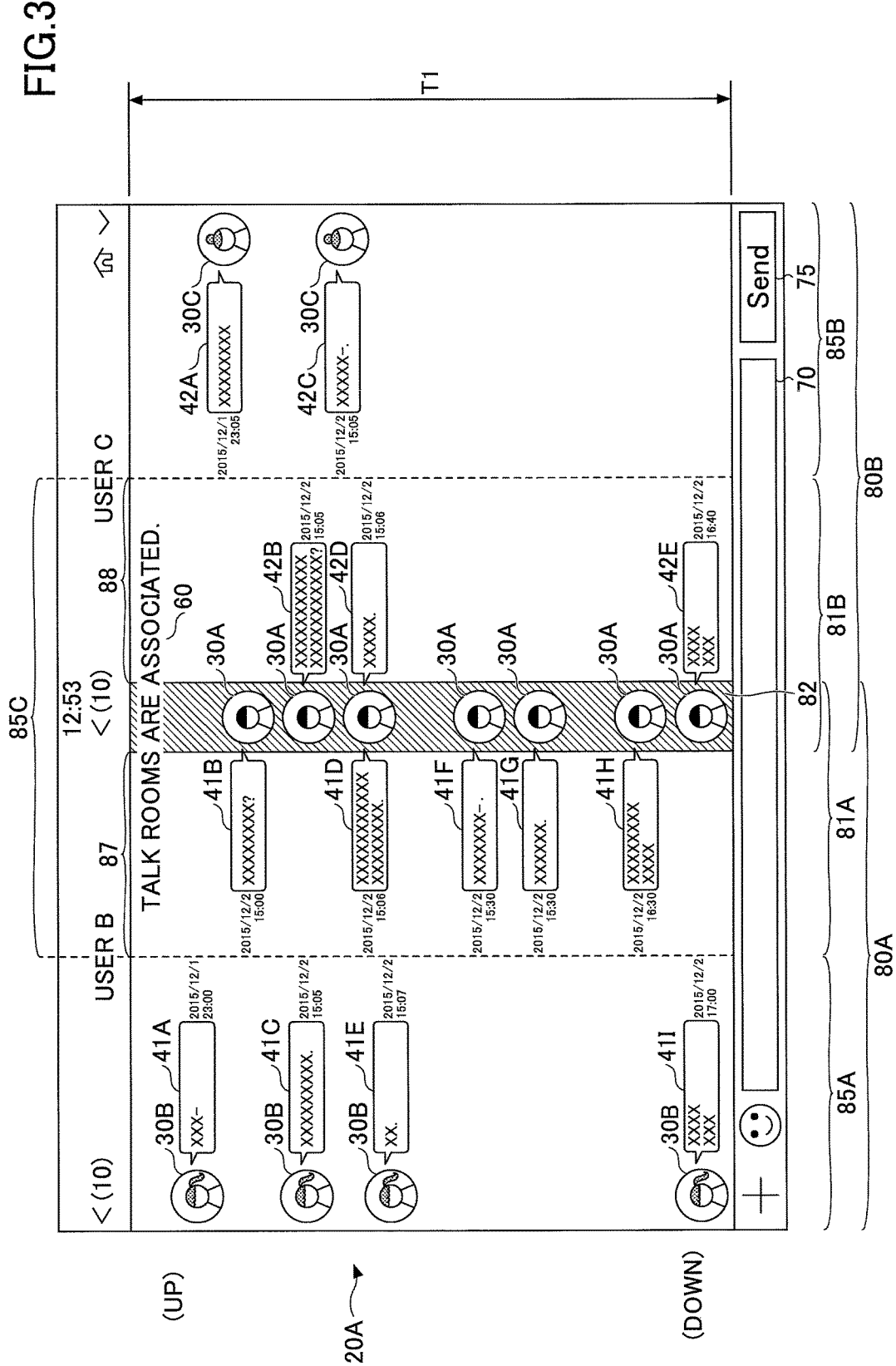

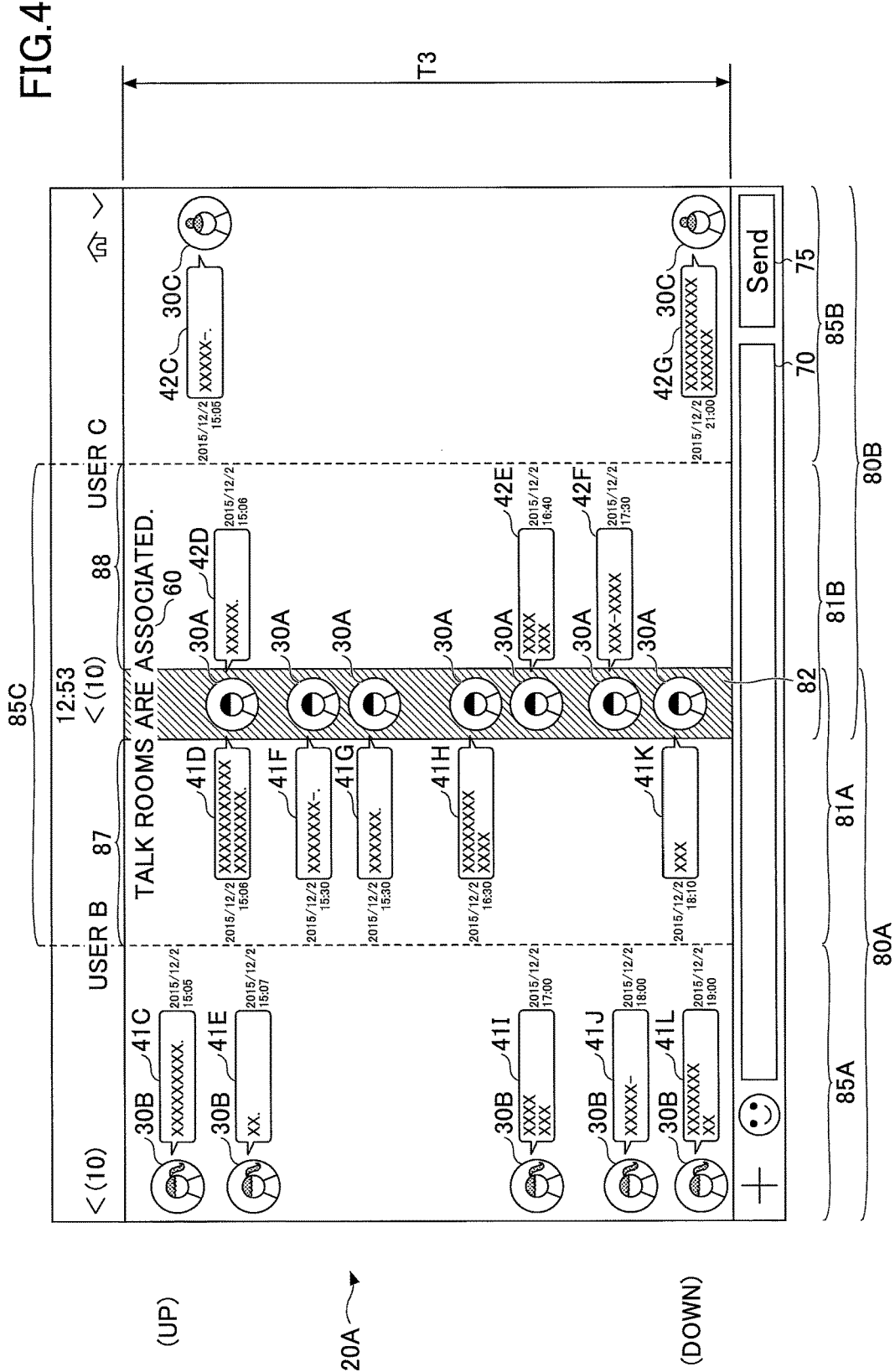

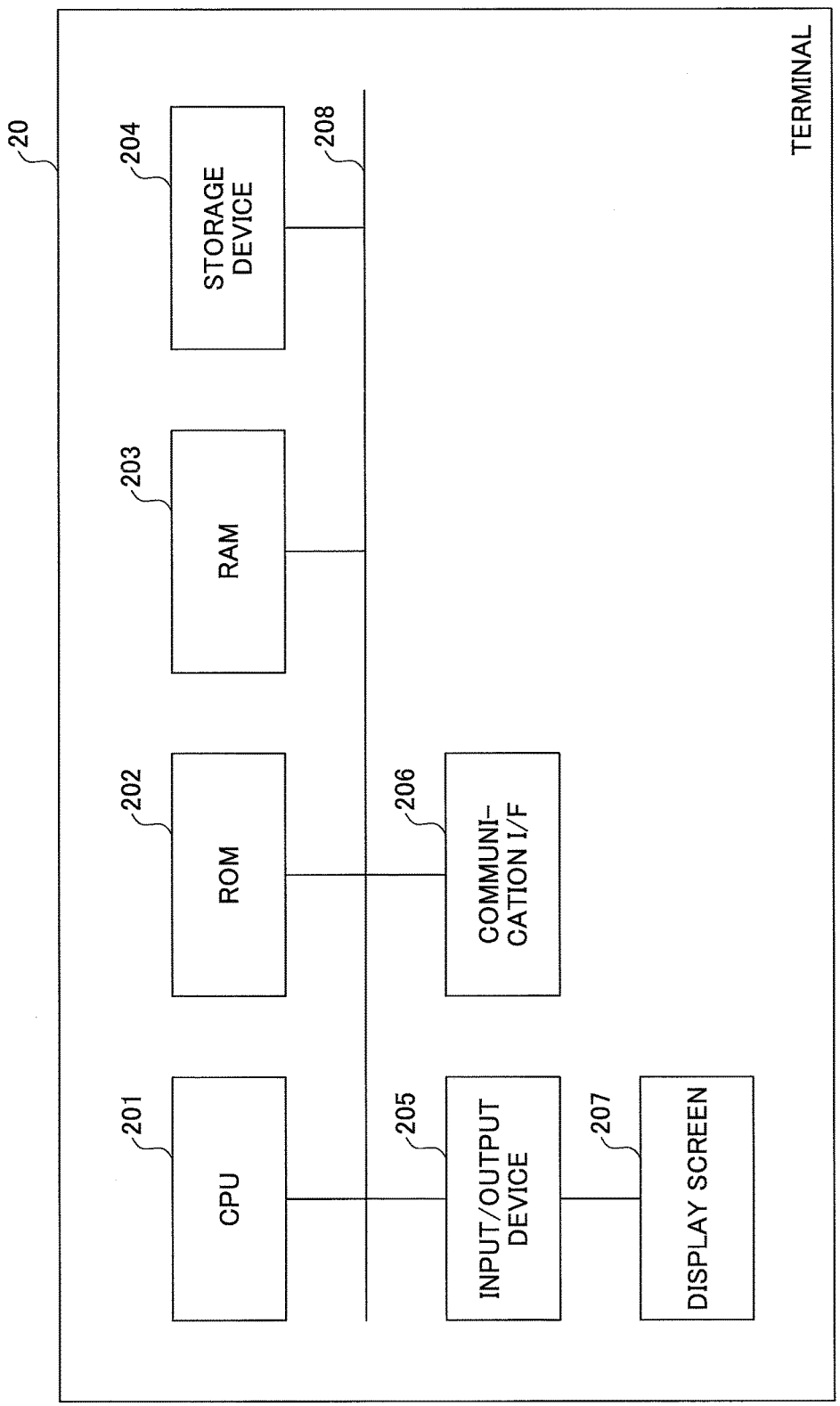

FIG.8

| TALK ROOM TO DISPLAY SIMULTANEOUSLY | TALK ROOM AREA | DISPLAY AREA | SETTING INFORMATION OF PREDETERMINED PERIOD |
|---|---|---|---|
| TALK ROOM ID:111 | FIRST TALK ROOM AREA 80A (XXX:YYY) | DISPLAY AREA 85A(TT:UU) USER B→USER A<br>PARTIAL AREA 81A(VV:WW) USER A→USER B | 12 HOURS |
| TALK ROOM ID:222 | SECOND TALK ROOM AREA 80B (MMM:NNN) | PARTIAL AREA 81B(AA:BB) USER A→USER C<br>DISPLAY AREA 85B(CC:DD) USER C→USER A | |

| MESSAGE ID | SENDER | RECIPIENT | TIME | MESSAGE |
|---|---|---|---|---|
| 123 | USER B | USER A | 2015/12/1 23:00 | XXX |
| 124 | USER A | USER B | 2015/12/2 5:00 | YYY |

FIG.9B
250B

| MESSAGE ID | SENDER | RECIPIENT | TIME | MESSAGE |
|---|---|---|---|---|
| 213 | USER C | USER A | 2015/12/1 22:30 | KKK |
| 224 | USER A | USER C | 2015/12/2 7:30 | MMM |

FIG.9C

| MESSAGE ID | SENDER | RECIPIENT | TIME | MESSAGE |
|---|---|---|---|---|
| 213 | USER C | USER A | 2015/12/1 22:30 | KKK |
| 123 | USER B | USER A | 2015/12/1 23:00 | XXX |
| 124 | USER A | USER B | 2015/12/2 5:00 | YYY |
| 224 | USER A | USER C | 2015/12/2 7:30 | MMM |

250B

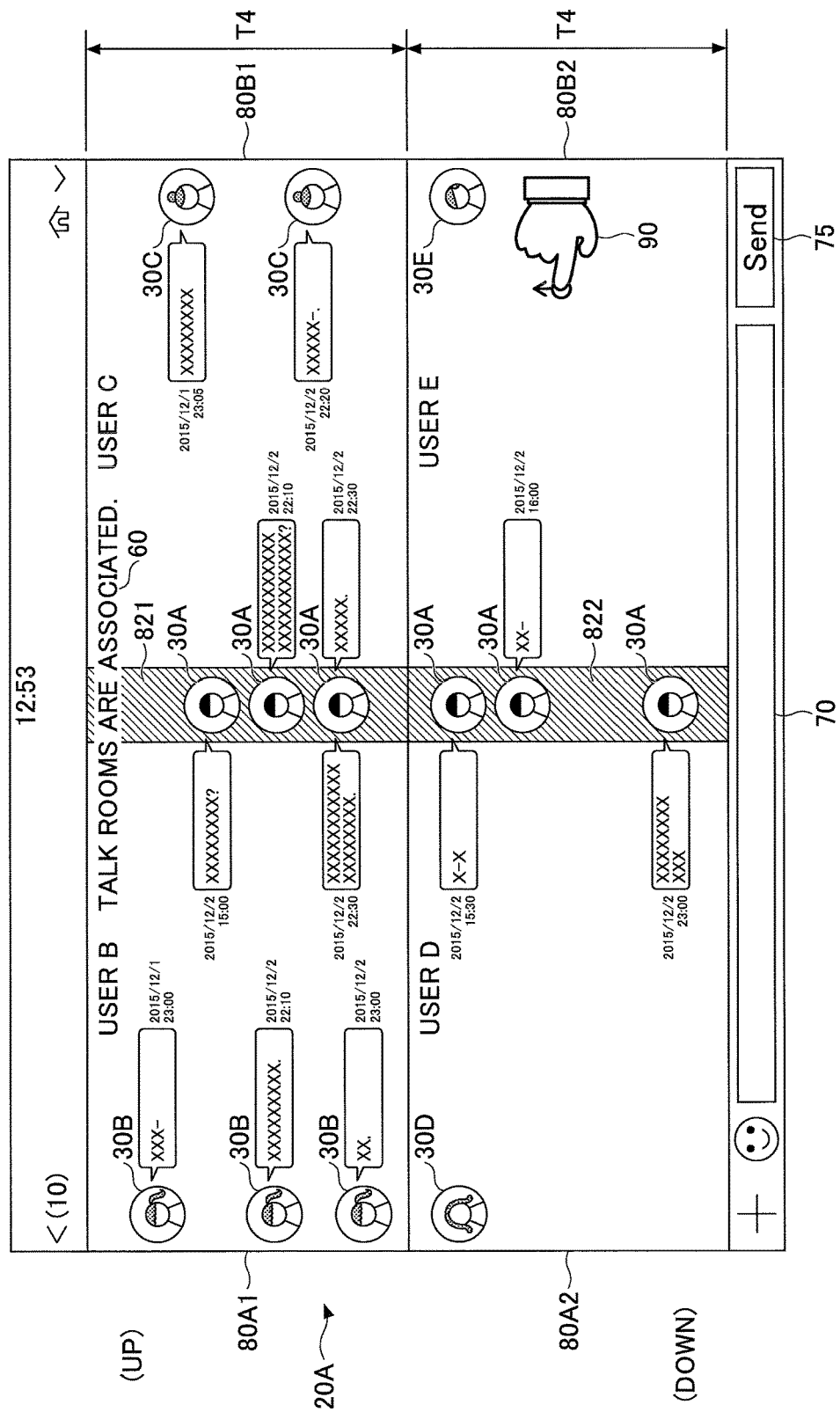

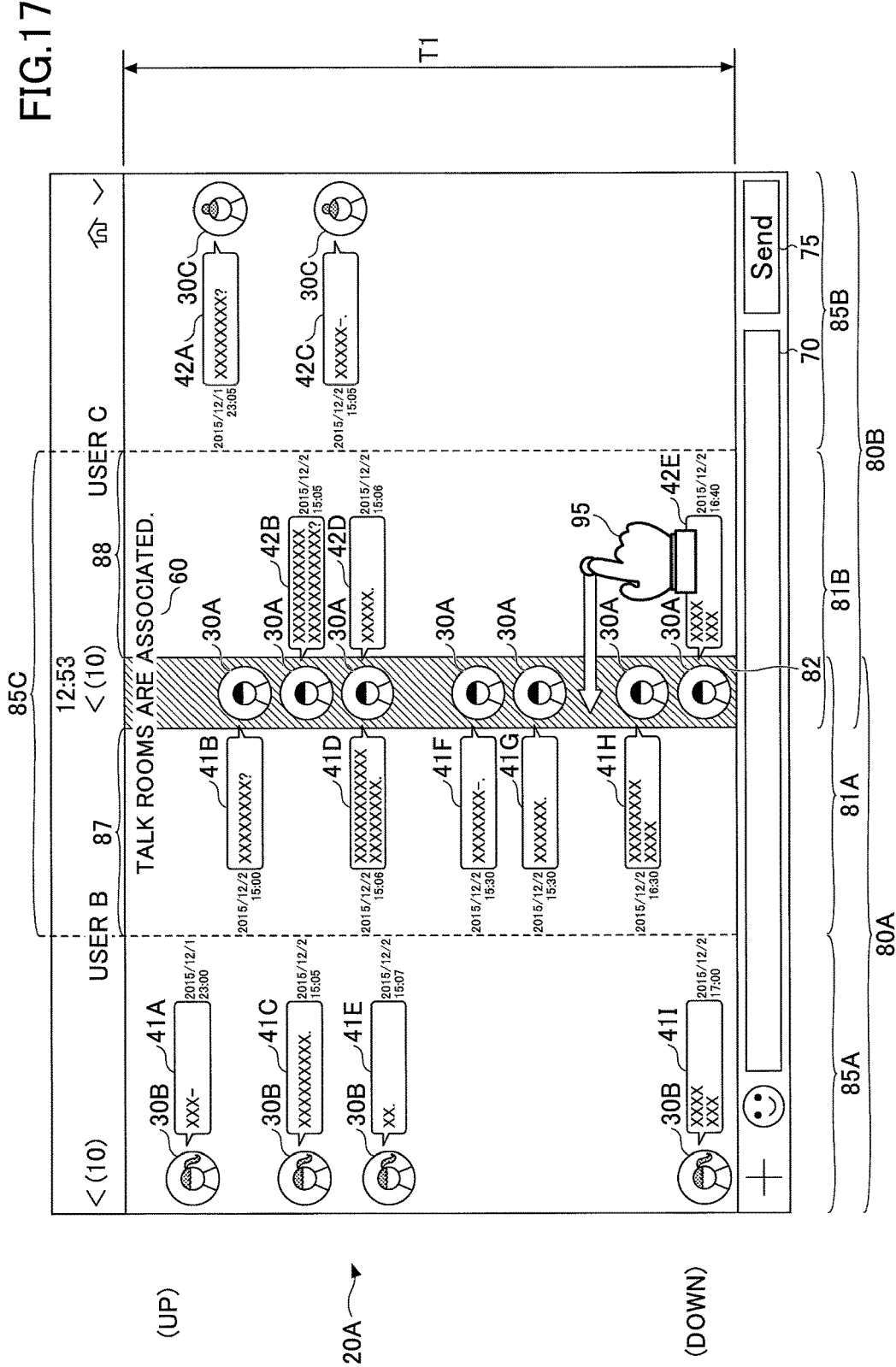

a
DISPLAY CONTROL METHOD, FIRST TERMINAL, AND STORAGE MEDIUM

BACKGROUND OF THE INVENTION

1. Field of the Invention

The present invention relates to a display control method for talk information, a first terminal, and a storage medium.

2. Description of the Related Art

With the spread of Social Network Service (SNS), chatting service using text messaging between users of SNS has become widely accepted. In chatting service, a chat group including two or more users is formed and messages are transmitted and received between the users that belong to the chat group.

With the spread of chatting service, there are methods for displaying a message transmitted or received in chatting service. For example, there is a method for displaying a response message in reply to a message transmitted in chatting service (Patent Document 1).

However, in chatting service in the related art, the contexts of messages transmitted or received in different chat groups are not displayed in association with each other. While messages transmitted or received in different chat groups are displayed in separate areas and the messages may be confirmed by a user, contexts in chat groups are not displayed in association with each other.

When transmitting and receiving messages simultaneously in different chat groups, a user of a terminal may not be able to confirm the context of each chat group.

RELATED ART DOCUMENTS

[Patent Document 1] Japanese Laid-Open Patent Application No. 2014-160467

SUMMARY OF THE INVENTION

It is an object of at least one embodiment of the present invention to associate messages transmitted and received in groups having different destinations so as to display the associated messages.

In an embodiment, a display control method performed by a first terminal of a first user is provided. The display control method includes receiving an instruction to display first talk information and second talk information on a screen of the first terminal, the first talk information including data transmitted and received between the first terminal of the first user and a second terminal of a second user, the second talk information including data transmitted and received between the first terminal of the first user and a third terminal of a third user; displaying, in a first display area of the screen, transmission data of the second user included in the first talk information; displaying, in a second display area of the screen, transmission data of the third user included in the second talk information, the second display area being different from the first display area; and displaying, in a third display area of the screen, transmission data of the first user included in the first talk information and in the second talk information, the third display area being different from the first display area and the second display area. Pieces of the transmission data of the first to third users included in the first talk information and the second talk information are displayed and spatially arranged in the first to third display areas in a single time sequence.

BRIEF DESCRIPTION OF THE DRAWINGS

Other objects and further features of embodiments will become apparent from the following detailed description when read in conjunction with the accompanying drawings, in which:

FIG. 3 is a diagram depicting display (first example) of a plurality of talk rooms according to the embodiment;

FIG. 4 is a diagram depicting display (second example) of a plurality of talk rooms according to the embodiment;

FIG. 6 is a diagram depicting a hardware configuration of a terminal according to the embodiment;

FIG. 8 is a diagram depicting a display setting table according to the embodiment;

FIG. 9A is a diagram depicting a message storing table according to the embodiment;

FIG. 9B is a diagram depicting a message storing table according to the embodiment;

FIG. 9C is a diagram depicting a message storing table according to the embodiment;

FIG. 14 is a diagram depicting display (third example) of a plurality of talk rooms according to the embodiment;

FIG. 17 is a diagram depicting a screen transition (first example) at a terminal according to the embodiment;

DESCRIPTION OF THE PREFERRED EMBODIMENTS

In the following, embodiments of the present invention will be described in detail.

Embodiment

<Outline>

Figure 1:
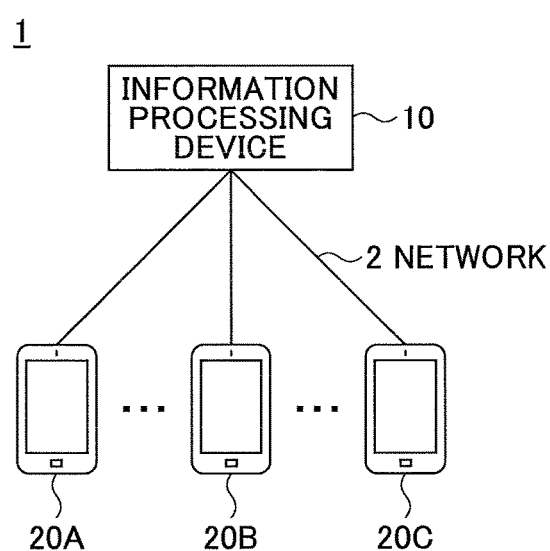
FIG. 1 is a diagram depicting a configuration of an information processing system according to an embodiment.

FIG. 1 is a diagram depicting a configuration of an information processing system 1 according to the embodiment. The information processing system 1 includes an information processing device 10 and a plurality of terminals 20 (a terminal 20A, a terminal 20B, and a terminal 20C). The information processing device 10 and the terminals 20 are connected via a network 2. The network 2 includes a wired network and a wireless network.

The information processing device 10 is realized by a server, for example. Examples of the terminal 20 include a smartphone, a tablet terminal, a Personal Computer (PC), a mobile phone, a game console, a touchpad, an electronic book reader, and a wearable terminal.

The information processing device 10 provides Social Network Service (SNS) to a user of the terminal 20. The user of the terminal 20 can receive provision of the SNS from the information processing device 10 by installing an application of the SNS in the terminal 20 and connecting the terminal 20 to the information processing device 10.

In the following embodiment, cases where chat exchanging service (hereafter "chatting service") is used between users of SNS are mainly described. However, a display control method according to the embodiment can also be applied to transmission or reception of electronic mails or making a voice call between the users.

The terminal 20 may use a web browser or the like to connect to the information processing device 10 and receive provision of the SNS.

When the chatting service is provided, the information processing device 10 receives a message from a terminal 20 and stores the received message and the information processing device 10 transmits the message to a terminal 20 of a destination user.

In the following, a display control method for a talk room according to the embodiment is described with reference to FIGS. 2A to 5C. When a talk room is started on the terminal 20, identification information of users (such as user icons) that belong to the talk room and messages transmitted and received between the users are displayed. The talk room here refers to a service menu of SNS generated to exchange chat messages between users of the SNS. The chat messages include at least one of text and a symbol. Two or more users are registered in the talk room. The talk room may also be referred to as a chat group or talk information.

In the display control method according to the embodiment, a plurality of talk rooms are displayed on the terminal 20. Users of the SNS usually transmit and receive messages in a plurality of talk rooms. In some cases, the messages transmitted and received in the talk rooms are preferably displayed simultaneously. In particular, when messages are transmitted and received around the same time in talk rooms related to each other, these messages are preferably displayed simultaneously on a screen of the terminal 20.

Examples of the talk rooms related to each other include a talk room for arranging a schedule of a first conference and a talk room for arranging a schedule of a second conference. Alternatively, examples of the talk rooms include a talk room for persons concerned within a company and a talk room for persons concerned outside the company in a case of project management.

Figure 2A:
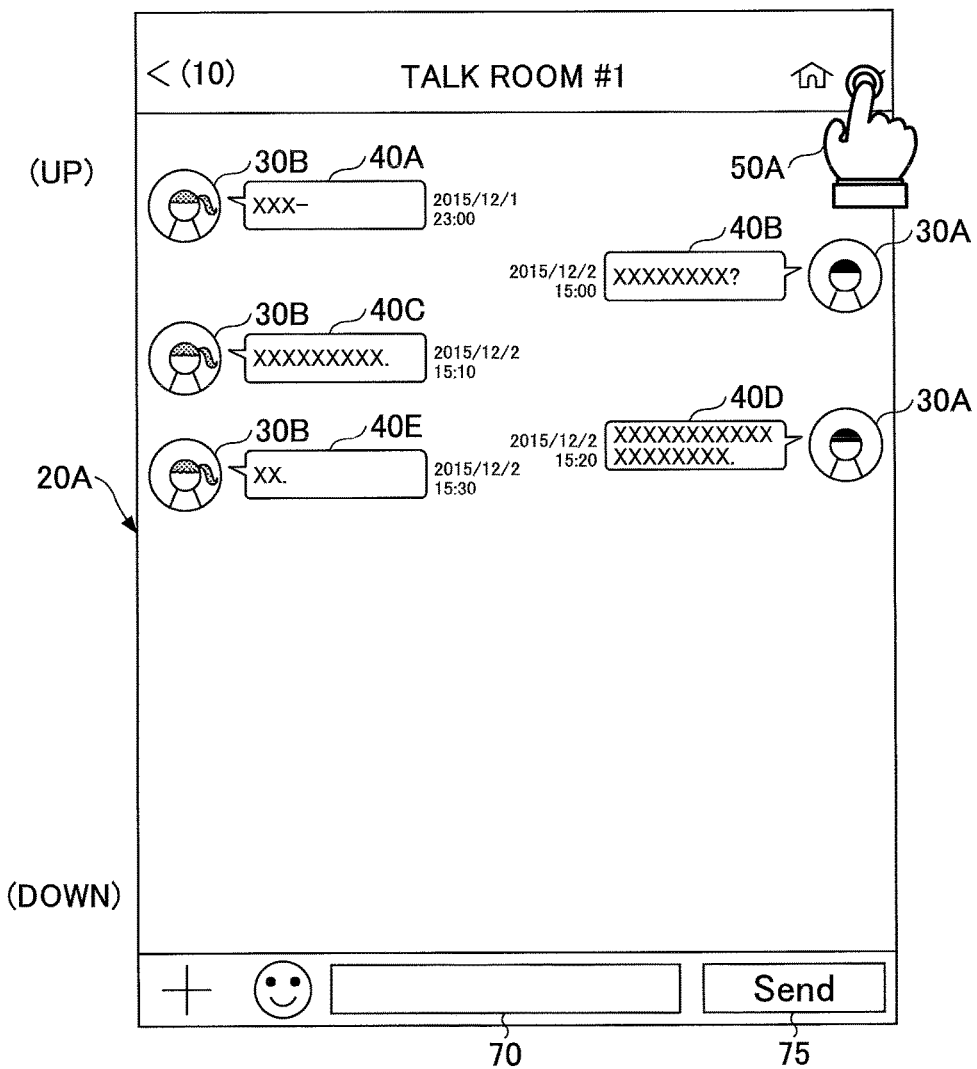
FIG. 2A is a diagram depicting a setting to display a plurality of talk rooms according to the embodiment.

In the following, display setting for the plurality of talk rooms in the terminal 20 is described with reference to FIGS. 2A to 2C. FIG. 2A is a diagram showing that a talk room #1 is displayed on the terminal 20A of a user A. In a right side on the screen of the terminal 20A, an icon 30A of the user A and messages 40 transmitted by the terminal 20A of the user A are displayed. In a left side on the screen of the terminal 20A, an icon 30B of a user B and messages 40 transmitted by the terminal 20B of the user B are displayed. The messages 40 transmitted and received between the user A and the user B are displayed in chronological order on the screen such that old messages are displayed in an upper part of the screen and new messages are displayed in a lower part of the screen. When a new message is transmitted and received, the message is displayed on the screen together with an icon 30 of a sender.

When the terminal 20A receives an instruction to display a plurality of talk rooms from the user A, a screen to prompt selection of talk rooms to display on the screen of the terminal 20A is displayed. For example, as shown in FIG. 2A, a screen to prompt selection of talk rooms may be displayed in response to selection of a menu 50A on the terminal 20A.

Figure 2B:
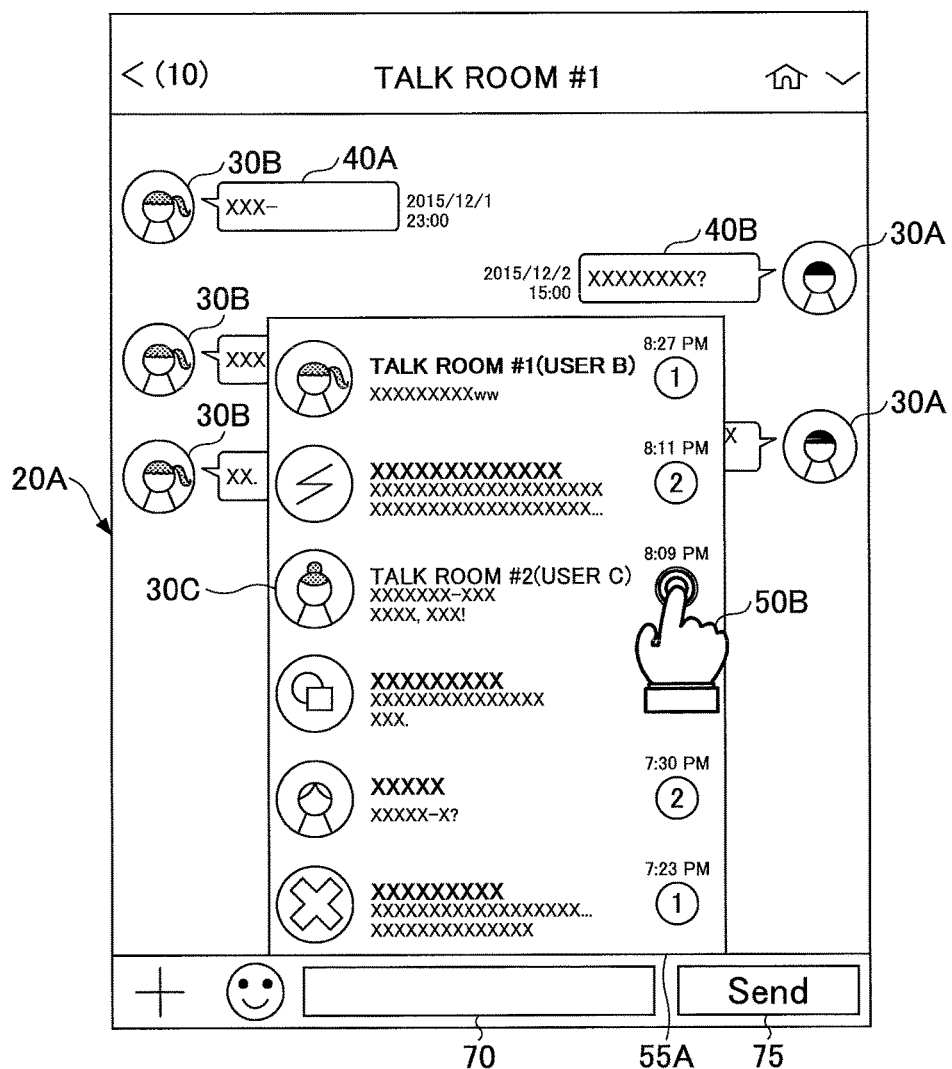
FIG. 2B is a diagram depicting a setting to display a plurality of talk rooms according to the embodiment.
Figure 2C:
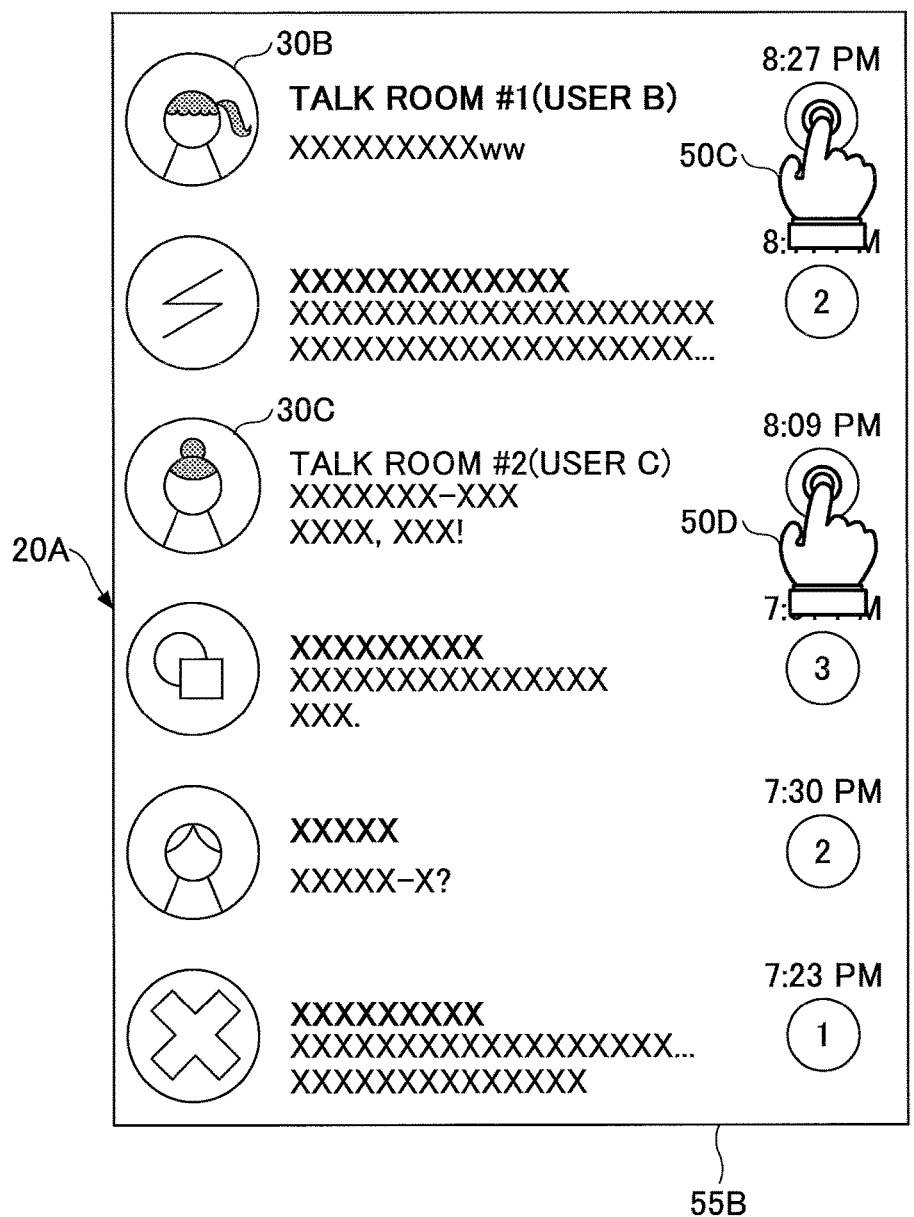
FIG. 2C is a diagram depicting a setting to display a plurality of talk rooms according to the embodiment.

FIGS. 2B and 2C show that the screen to prompt the selection of talk rooms is displayed on the terminal 20A. As shown in FIG. 2B, the terminal 20A displays a talk room list 55A and prompts the user A to select a talk room to display on the screen in addition to talk room #1. FIG. 2B shows that a selection item 50B for a talk room (talk room #2) between the user A and a user C is selected from the talk room list 55A by the user A. Further, as shown in FIG. 2C, the terminal 20A displays a talk room list 55B and prompts the user A to select a plurality of talk rooms to display on the screen. FIG. 2C shows that a selection item 50C for talk room #1 and a selection item 50D for talk room #2 are selected from the talk room list 55B by the user A.

When the terminal 20A receives an instruction to display the plurality of talk rooms, the terminal 20A displays the talk rooms on the screen.

FIG. 3 is a diagram depicting display (first example) of a plurality of talk rooms on the terminal 20A.

In a first talk room area 80A, talk room #1 is displayed as a talk room between the user A and the user B. Specifically, the icon 30A of the user A, the icon 30B of the user B, and messages 41 transmitted and received between the user A and the user B are displayed. Further, in a second talk room area 80B, talk room #2 is displayed as a talk room between the user A and the user C. Specifically, the icon 30A of the user A, an icon 30C of the user C, and messages 42 transmitted and received between the user A and the user C are displayed.

As shown in FIG. 3, the first talk room area 80A and the second talk room area 80B include an overlapping area 82. In the overlapping area 82, the icon 30A of the user A is displayed.

Messages transmitted and received between the user A and the user B in talk room #1 and messages transmitted and received between the user A and the user C in talk room #2 are displayed and spatially arranged in a single time sequence such that old messages are displayed in an upper part of the screen and new messages are displayed in a lower part of the screen. In other words, the terminal 20A adjusts time sequences between the talk rooms and displays messages in talk room #1 and talk room #2 on the screen. In FIG. 3, messages transmitted and received in a predetermined period T1 are displayed on the screen. Specifically, messages transmitted and received from 23:00 (start time) on Dec. 1, 2015 to 17:00 (end time) on Dec. 2, 2015 in talk room #1 and talk room #2 are displayed.

In accordance with this, the user A can confirm messages exchanged in talk room #1 and talk room #2 with in the single time sequence and can easily confirm when each message is exchanged.

When the terminal 20A receives an operation such as scrolling in the first talk room area 80A and displays messages transmitted and received before 23:00 on Dec. 1, 2015 in talk room #1, such as messages transmitted and received in a predetermined period T2, messages between the user A and the user C in the predetermined period T2 are displayed in the second talk room area 80B in the same manner.

The terminal 20A displays on the screen that display of talk rooms is adjusted to associate talk rooms. In FIG. 3, a sign 60 "talk rooms are associated" indicates that display of talk rooms is adjusted.

As shown in FIG. 3, while the plurality of talk rooms are displayed, one message input field 70 (input area) is disposed. When a message is input to the input field 70 and a transmission menu 75 (Send) for the message is selected, the message is posted. A method for the terminal 20 to determine which talk room the message is addressed to is described later.

The terminal 20A determines a talk room area 80 of a message from a sender and a destination of the message and displays the message on the screen together with the icon 30 of the user as the sender. If the terminal 20A receives a message from the user B to the user A from the information processing device 10, the terminal 20A displays the message together with the icon 30B of the user B in a first display area 85A within the first talk room area 80A. The first display area 85A is set in a left side of the first talk room area 80A. If the terminal 20A receives a message from the user C to the user A from the information processing device 10, the terminal 20A displays the message together with the icon 30C of the user C in a second display area 85B within the second talk room area 80B. The second display area 85B is set in a right side of the second talk room area 80B.

If the terminal 20A receives an instruction to transmit a message to the user B from the user A, the terminal 20A displays the message together with the icon 30A of the user A in a partial area 81A within the first talk room area 80A. The partial area 81A is set in a right side of the first talk room area 80A. The partial area 81A includes the overlapping area 82 and the icon 30A of the user A is displayed in the overlapping area 82. In the partial area 81A, the message is displayed in an area (area 87 in FIG. 3) outside the overlapping area 82.

If the terminal 20A receives an instruction to transmit a message to the user C from the user A, the terminal 20A displays the message together with the icon 30A of the user A in a partial area 81B within the second talk room area 80B. The partial area 81B is set in a left side of the second talk room area 80B. The partial area 81B includes the overlapping area 82 and the icon 30A of the user A is displayed in the overlapping area 82. In the partial area 81B, the message is displayed in an area (area 88 in FIG. 3) outside the overlapping area 82.

In other words, the icons 30A of the user are displayed in chronological order in the overlapping area 82 when the user A receives the messages regardless of the talk rooms.

As mentioned, above, messages of the user A and the icons 30A of the user A are displayed in the partial area 81A and the partial area 81B. The partial area 81A and the partial area 81B are included in a third display area 85C.

In the embodiment, a form where the talk room between the user A and the user B and the talk room between the user A and the user C are started is mainly described. However, it is possible to apply the same form to a case where three or more users belong to the talk room and messages are transmitted and received within a group.

In the embodiment, a form where messages are displayed in the talk room is mainly described. However, it is possible to apply the same form to a case where transmission data other than messages is displayed. In this case, the transmission data includes a message, a sticker, a still image, a movie, and a combination thereof. The transmission data may be displayed together with an icon of a user as user identification information of a sender. Further, the transmission data may be transmitted in response to an input to the input field 70 and selection of the transmission menu 75.

FIG. 4 is a diagram depicting display (second example) of a plurality of talk rooms on the terminal 20A. FIG. 4 shows that the terminal 20A of the user A transmits and receives new messages with the user B and with the user C. The terminal 20A newly transmits and receives a message 41J, a message 41K, and a message 41L with the user B and newly transmits and receives a message 42F and a message 42G with the user C, so that these messages are displayed on the screen. When the new messages are displayed on the screen, the terminal 20A deletes a message 41A, a message 41B, a message 42A, and a message 42B from the screen. In other words, the terminal 20A changes a display location of a message on the screen such that messages transmitted and received in a predetermined period T3 are displayed.

The predetermined periods (T1, T2, T3) are set by the terminal 20 depending on the size of the screen of the terminal 20, the number of messages, and the number of characters included in each message. The terminal 20 applies the same period to the talk rooms being displayed. In accordance with this, it is possible to confirm messages transmitted and received in the talk rooms in the single time sequence.

In the following, a method for determining a recipient of a message is described with reference to FIGS. 5A to 5C. The terminal 20A receives an input of a message and an instruction to transmit the message from the user A, and then receives an instruction to specify a recipient from the user A.

Figure 5A:
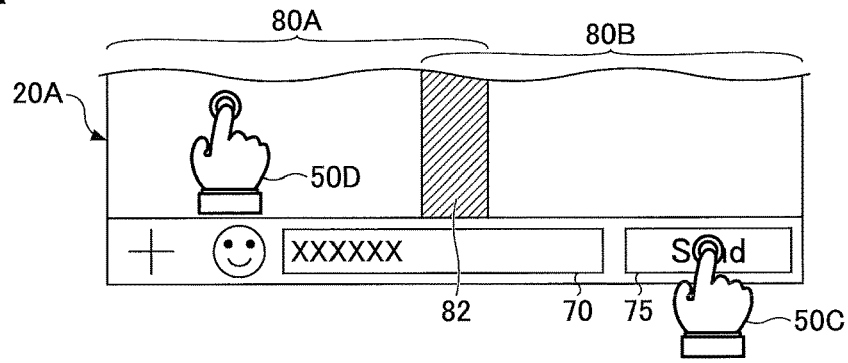
FIG. 5A is a diagram depicting a method (first example) for determining a recipient of a message according to the embodiment.

FIG. 5A shows that an instruction to specify a recipient is received from the user A. The terminal 20A receives an input of a message "XXXXXX" into the input field 70 and receives an instruction of the transmission menu 75 by a tapping operation (50C). Next, the terminal 20A receives a tapping operation on the first talk room area 80A from the user A (50D). In accordance with this, the terminal 20A determines transmission of the message to talk room #1 being displayed in the first talk room area 80A.

Figure 5B:
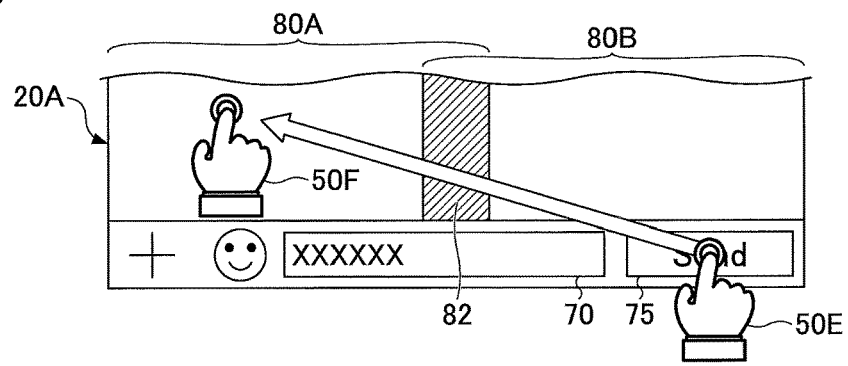
FIG. 5B is a diagram depicting a method (first example) for determining a recipient of a message according to the embodiment.

FIG. 5B shows that an instruction to specify a recipient is received from the user A. The terminal 20A receives an input of a message "XXXXXX" into the input field 70, selection of the transmission menu 75, and a drag-and-drop operation of the transmission menu 75 to the first talk room area 80A. In accordance with this, the terminal 20A determines transmission of the message to talk room #1 being displayed in the first talk room area 80A.

Figure 5C:
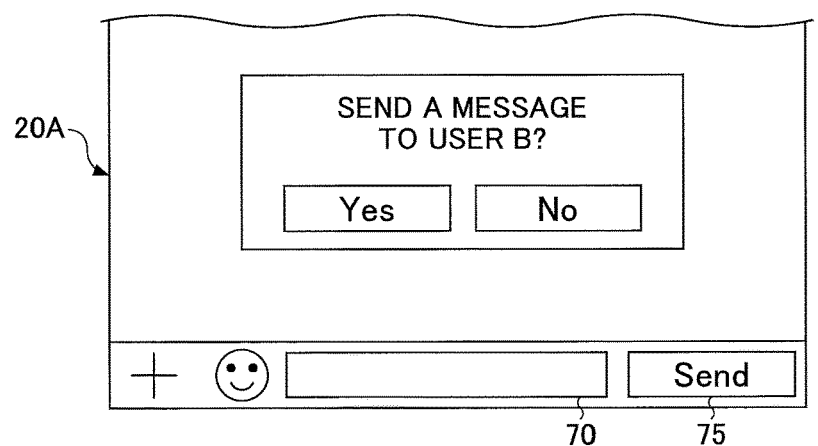
FIG. 5C is a diagram depicting a method (first example) for determining a recipient of a message according to the embodiment.

In order to prevent an erroneous addressing of the message, the terminal 20 may display a confirmation message as shown in FIG. 5C on the screen.

According to the embodiment, it is possible to cause the terminal 20 to simultaneously display contexts of messages transmitted and received in the plurality of talk rooms related to each other. In accordance with this, the user of the terminal 20 can confirm the contexts of the talk rooms related to each other.

In addition, each area may be differentiated using broken lines or solid lines or a different background color may be set in each area, such that the user of the terminal 20 is able to distinguish the talk room areas (80A, 80B), the overlapping area 82, and the display areas (85A, 85B, 85C).

<Hardware Configuration>

In the following, a hardware configuration of each device included in the terminal 20 is described. FIG. 6 is a diagram depicting the hardware configuration of the terminal 20 according to the embodiment.

The terminal 20 includes a CPU 201, a ROM 202, a RAM 203, a storage device 204, an input/output device 205, a communication I/F 206, and a display screen 207 (display device). In addition, each constituent element of the hardware of the terminal 20 is interconnected via a bus 208.

The storage device 204 stores various types of programs. The CPU 201 includes a processor that executes the programs stored in the storage device 204.

The ROM 202 includes a non-volatile memory. The ROM 202 stores various types of programs and data necessary for the CPU 201 to execute the programs stored in the storage device 204.

The RAM 203 includes a main storage device such as a Dynamic Random Access Memory (DRAM), a Static Random Access Memory (SRAM), or the like. The RAM 203 functions as a work area where programs are loaded when being executed by the CPU 201.

The input/output device 205 includes functions of an input device that inputs various types of instructions to the terminal 20 and an output device that outputs a result of a process performed in the terminal 20. The input/output device 205 is connected to the display screen 207. In the embodiment, the display screen 207 may be a touch-responsive display (touch panel). The communication I/F 206 performs communication between the terminal 20 and the information processing device 10 via the network 2.

When the terminal 20A executes a program stored in the storage device 204 or the like, it is possible to implement functions of the terminal 20.

<Functional Configuration>

Figure 7:
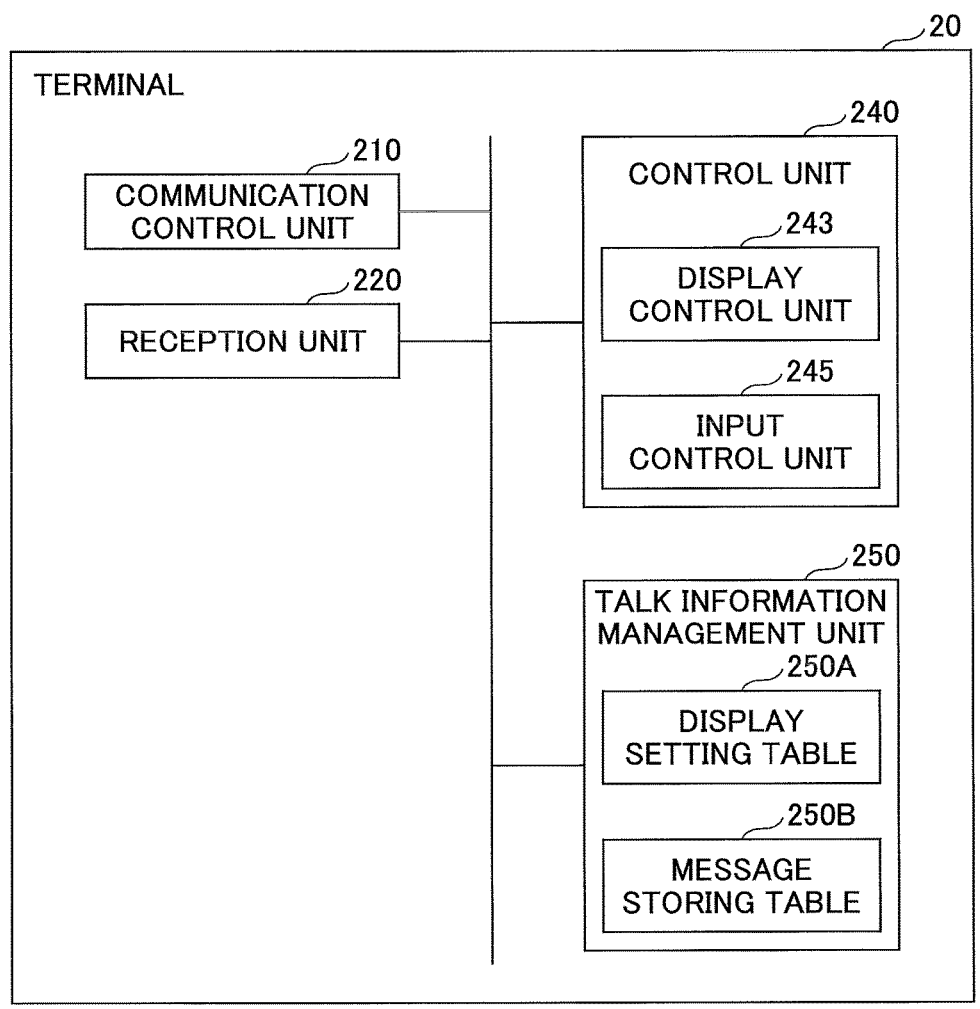
FIG. 7 is a diagram depicting a functional configuration of a terminal according to the embodiment.

A functional configuration of the terminal 20 according to the embodiment is described with reference to FIG. 7. The terminal 20 includes a communication control unit 210, a reception unit 220, a control unit 240, and a talk information management unit 250. The control unit 240 further includes a display control unit 243 and an input control unit 245.

The communication control unit 210 receives a message addressed to the terminal 20 from the information processing device 10. Further, the communication control unit 210 transmits a message addressed to another user to the information processing device 10.

The reception unit 220 receives various types of instructions from the user of the terminal 20 and reports the received instruction to the input control unit 245. The reception unit 220 receives an instruction to display a plurality of talk rooms from the user of the terminal 20 and reports this instruction to the input control unit 245. The reception unit 220 receives an input of a message from the user of the terminal 20. Further, the reception unit 220 receives specification of recipient of the input message. The reception unit 220 reports the input message and information of the specified recipient to the input control unit 245.

The control unit 240 performs control on function units of the terminal 20.

The display control unit 243 displays various information on the screen of the terminal 20. The display control unit 243 displays a plurality of talk rooms on the screen of the terminal 20. Further, the display control unit 243 displays information about settings of the talk rooms on the screen and prompts the user of the terminal 20 to set the talk rooms.

When the communication control unit 210 receives a message from another user, the display control unit 243 displays the received message on the screen of the terminal 20.

The input control unit 245 determines contents of input received by the reception unit 220. If the input control unit 245 determines that the reception unit 220 receives an instruction of display of a plurality of talk rooms, the display control unit 243 causes the terminal 20 to perform display on the screen in accordance with the received instruction. The input control unit 245 determines that the reception unit 220 receives an instruction of transmission of a message to a specified talk room and the input control unit 245 sends an instruction to transmit the message to the specified talk room to the communication control unit 210.

The control unit 240 (display control unit 243 and input control unit 245) sends an instruction to store information related to display of the talk rooms and information about each talk room to the talk information management unit 250. The talk room information includes identification information of users (user names, icons 30 of users, or the like) that belong to a corresponding talk room and messages transmitted and received in the talk room.

The talk information management unit 250 includes a display setting table 250A and a message storing table 250B. When the talk information management unit 250 receives an instruction from the control unit 240, the talk information management unit 250 stores various information in the tables. Further, the talk information management unit 250 receives reference to stored information from the control unit 240 (display control unit 243, input control unit 245).

In the following, the display setting table 250A is described with reference to FIG. 8. In the display setting table 250A, values are set within the table only if a plurality of talk rooms are displayed on the screen of the terminal 20. The display control unit 243 refers to the display setting table 250A and specifies a location where messages transmitted and received in the terminal 20 are displayed.

In the "talk room to display simultaneously," talk room IDs to identify talk rooms to display simultaneously on the screen of the terminal 20 are set. In FIG. 8, "talk room ID: 111" and "talk room ID: 222" are set.

In the "talk room area," the talk room area 80 of a corresponding talk room is set. FIG. 8 shows that information about the "talk room ID: 111" is displayed in the "first talk room area 80A" and information about the "talk room ID: 222" is displayed in the "second talk room area 80B." In this case, "XXX:YYY" and "MMM:NNN" include information to specify each talk room area 80 on the screen of the terminal 20. In addition, the first talk room area 80A and the second talk room area 80B have the overlapping area 82 where information of the user A such as the icon 30A of the user A is displayed.

The "display area" includes information to specify a display area 85 or a partial area 81 on the screen of the terminal 20 and information to specify messages to display on the areas. For example, the first display area 85A is set in an area specified by "TT:UU" on the screen of the terminal 20, in which the icons 30B of the user B and messages from the user B to the user A are displayed in a talk room identified by the "talk room ID: 111." If a new message is transmitted and received, the message is displayed beneath messages that are already being displayed in the display area 85 or the partial area 81 that are set.

In the above description, two talk rooms are simultaneously displayed on the screen of the terminal 20. In a case where three or more talk rooms are simultaneously displayed on the screen of the terminal 20, the same or similar values are set in the display setting table 250A.

In the "setting information of predetermined period," a method for adjusting time sequences when talk rooms are displayed on the screen of the terminal 20 is set. As mentioned above, when the talk rooms are displayed on the screen of the terminal 20, the messages in each talk room are displayed and spatially arranged in a single time sequence. In FIG. 8, "12 hours" is set in the "setting information of predetermined period." Accordingly, in each display area 85 of the screen of the terminal 20, messages transmitted and received within 12 hours are displayed. For example, if the time "23:00 on Dec. 1, 2015" is displayed with a message on an uppermost part of the screen of the terminal 20, the screen of the terminal 20 displays messages in each talk room transmitted and received from 23:00 on Dec. 1, 2015 to 11:00 on Dec. 2, 2015.

In addition, in the "setting information of predetermined period", the number of displayable messages or the number of characters per display area 85 may be set. The display control unit 243 adjusts messages displayed in the talk room area 80 in accordance with these types of setting information of predetermined period.

In the following, the message storing table 250B is described with reference to FIGS. 9A to 9C. As shown in FIGS. 9A and 9B, the message storing table 250B is set for each talk room. In the "message ID," information to uniquely identify a message transmitted and received in the talk room is set. In the "sender," a sender of the message is set. In the "recipient," a recipient of the message is set. The display control unit 243 refers to the sender and the recipient in the message storing table 250B and the talk room area 80 and the display area 85 in the display setting table 250A, so that the display control unit 243 specifies an area to display messages.

In the "time," a time when the terminal 20 transmits a message or a time when a message the terminal 20 receives a message is set. In the "message," specific contents of a message are set.

If a plurality of talk rooms are displayed on the screen of the terminal 20, the message storing tables 250B may be integrated as shown in FIG. 9C, or the message storing table 250B may be set for each talk room.

<Operation Procedure>

Figure 10:
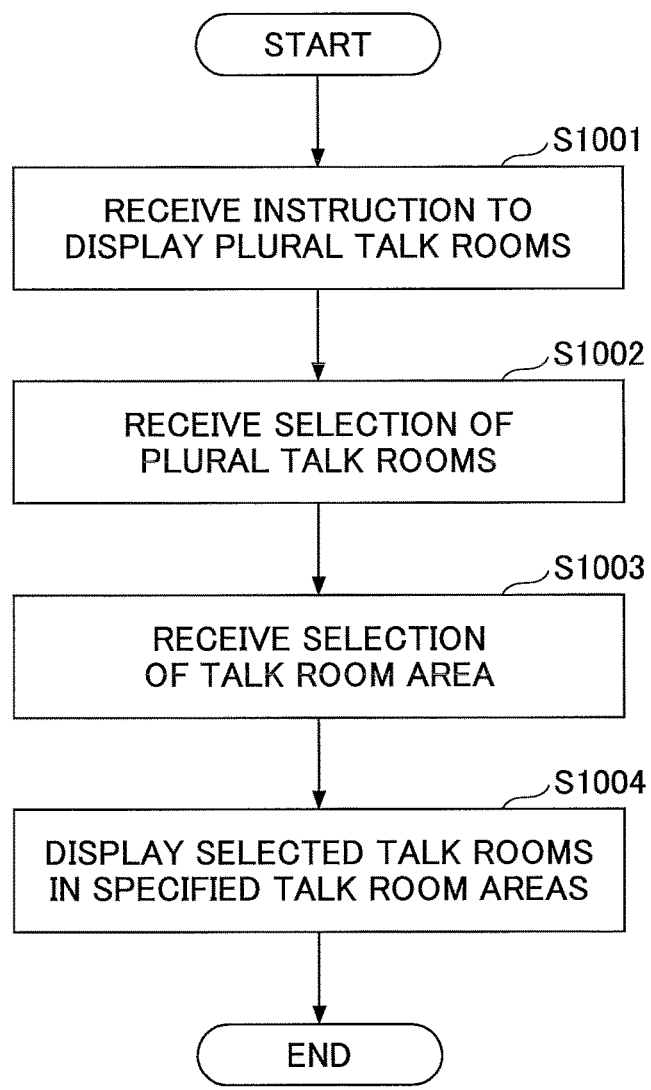
FIG. 10 is a flowchart of an operation (first example) according to the embodiment.

In the following, an operation procedure according to the embodiment is described with reference to FIGS. 10 to 12. FIG. 10 is a flowchart of an operation to set a plurality of talk room areas 80 in the terminal 20.

In step S1001, the input control unit 245 determines that the reception unit 220 receives an instruction to display a plurality of talk rooms on the screen of the terminal 20 from the user of the terminal 20.

In step S1002, in response to the reception of the instruction, the display control unit 243 causes the terminal 20 to display a talk room list on the screen, the talk room list being registered in the terminal 20, and the reception unit 220 receives selection of a plurality of talk rooms from the user of the terminal 20.

In step S1003, the reception unit 220 receives selection of the talk room area 80 of the selected talk rooms. For example, the reception unit 220 receives an instruction to display talk room #1 in the first talk room area 80A in a left side of the screen and to display talk room #2 in the second talk room area 80B in a right side of the screen. The input control unit 245 determines contents of the instruction received by the reception unit 220. The input control unit 245 stores information about the talk room area 80 of each talk room in the display setting table 250A.

In step S1004, the display control unit 243 displays the selected talk rooms in the selected talk room areas 80.

Figure 11:
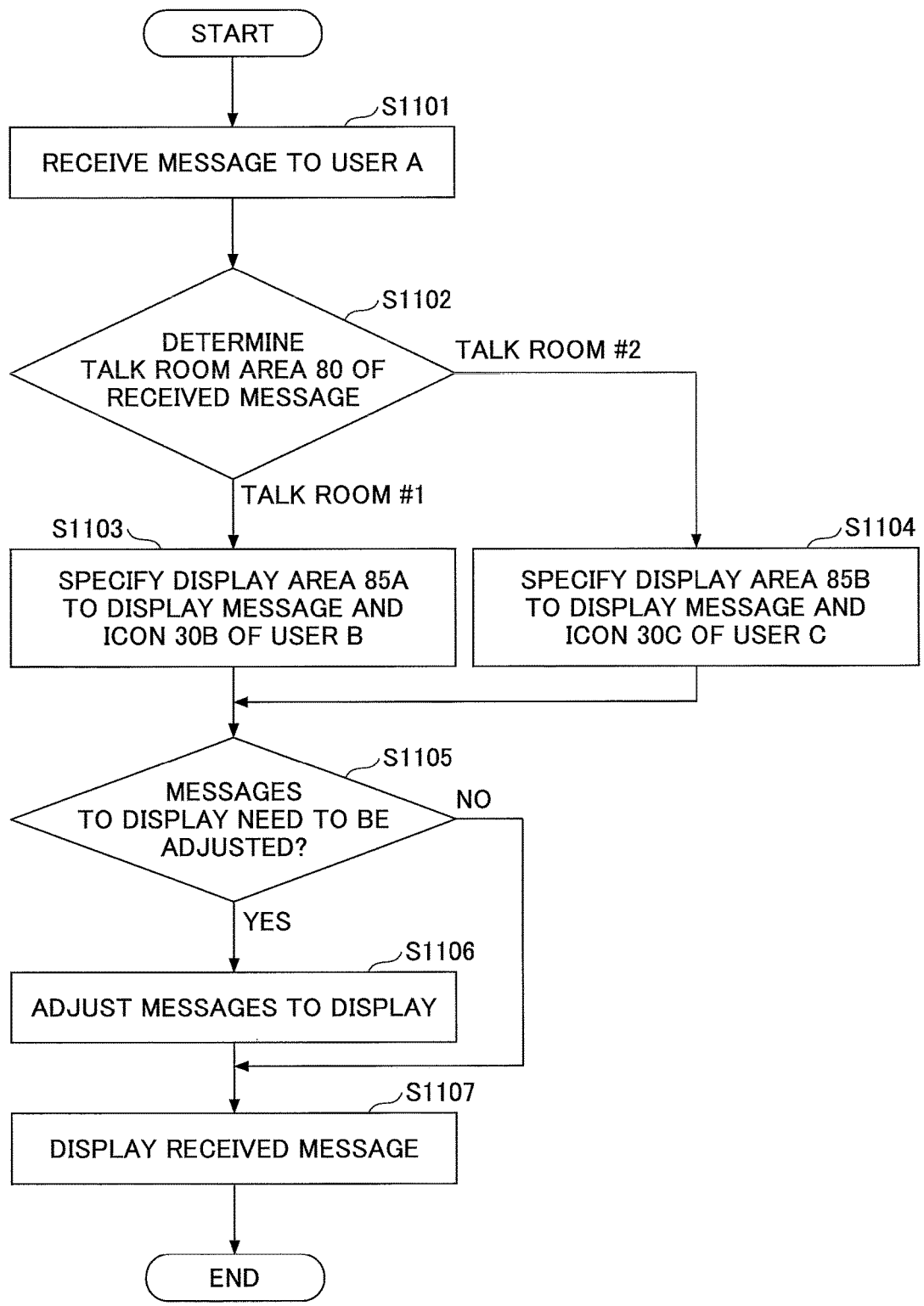
FIG. 11 is a flowchart of an operation (second example) according to the embodiment.

FIG. 11 is a flowchart of an operation when the terminal 20A of the user A receives a message from the information processing device 10. When the operation in FIG. 11 is performed, it is assumed that the first talk room area 80A to display talk room #1 and the second talk room area 80B to display talk room #2 are set on the screen of the terminal 20A of the user A and that the user A and the user B belong to talk room #1 and the user A and the user C belong to talk room #2.

In step S1101, the communication control unit 210 receives a message addressed to the user A from the information processing device 10.

In step S1102, the display control unit 243 refers to the display setting table 250A to determine the talk room area 80 of the received message. If the sender of the message is user B and the message is addressed to the user A, namely, if the message is posted to talk room #1, the process proceeds to step S1103. In contrast, if the sender of the message is C and the message is addressed to the user A, namely, if the message is posted to talk room #2, the process proceeds to step S1104.

In step S1103, the display control unit 243 refers to the display setting table 250A to specify the display area 85 where the message and the icon 30B of the user B are displayed and to determine a location where the message and the icon 30B are displayed within the display area 85. In this case, it is assumed that the message transmitted by the user B and the icon 30B are displayed in the first display area 85A. This message and the icon 30B are displayed in the location within the first display area 85A, the location being positioned at a distance of a predetermined length in a downward direction from the last transmitted and received message in talk room #1.

In step S1104, the display control unit 243 refers to the display setting table 250A to determine a location where the message transmitted by the user C and the icon 30C of the user C are displayed in the same manner as in step S1103.

In step S1105, the display control unit 243 determines whether it is necessary to adjust messages being displayed on the screen of the terminal 20 in order to display the received message. Specifically, the display control unit 243 determines whether it is necessary to delete the messages being displayed and change display locations when displaying the received message. The display control unit 243 refers to the "setting information of predetermined period" in display setting table 250A upon determination.

If adjustment is necessary (YES in step S1105), the process proceeds to step S1106. If adjustment is unnecessary (NO in step S1105), the process proceeds to step S1107.

In a case where the adjustment is necessary, there is a message that needs to be deleted from the screen of the terminal 20 when the newly received message is displayed.

In step S1106, based on the "setting information of predetermined period" in the display setting table 250A, the display control unit 243 adjusts messages in talk room #1 and talk room #2 being displayed on the screen of the terminal 20.

For example, if 12 hours is set in the "setting information of predetermined period," and a message is received at 13:00 on Dec. 1, 2015, messages received before 01:00 on Dec. 1, 2015 are deleted from the screen of the terminal 20. Further, if the number of displayable characters is set for the display area 85 in the "setting information of predetermined period," the display control unit 243 adjusts a predetermined period T during which messages in talk room #1 and talk room #2 are displayed on the screen of the terminal 20 such that the requirements of the number of displayable characters are satisfied.

In step S1107, the display control unit 243 displays the received message on the screen of the terminal 20. Further, the display control unit 243 displays, on the screen of the terminal 20, messages transmitted and received in talk room #1 and talk room #2 during the predetermined period T before the message.

Figure 12:
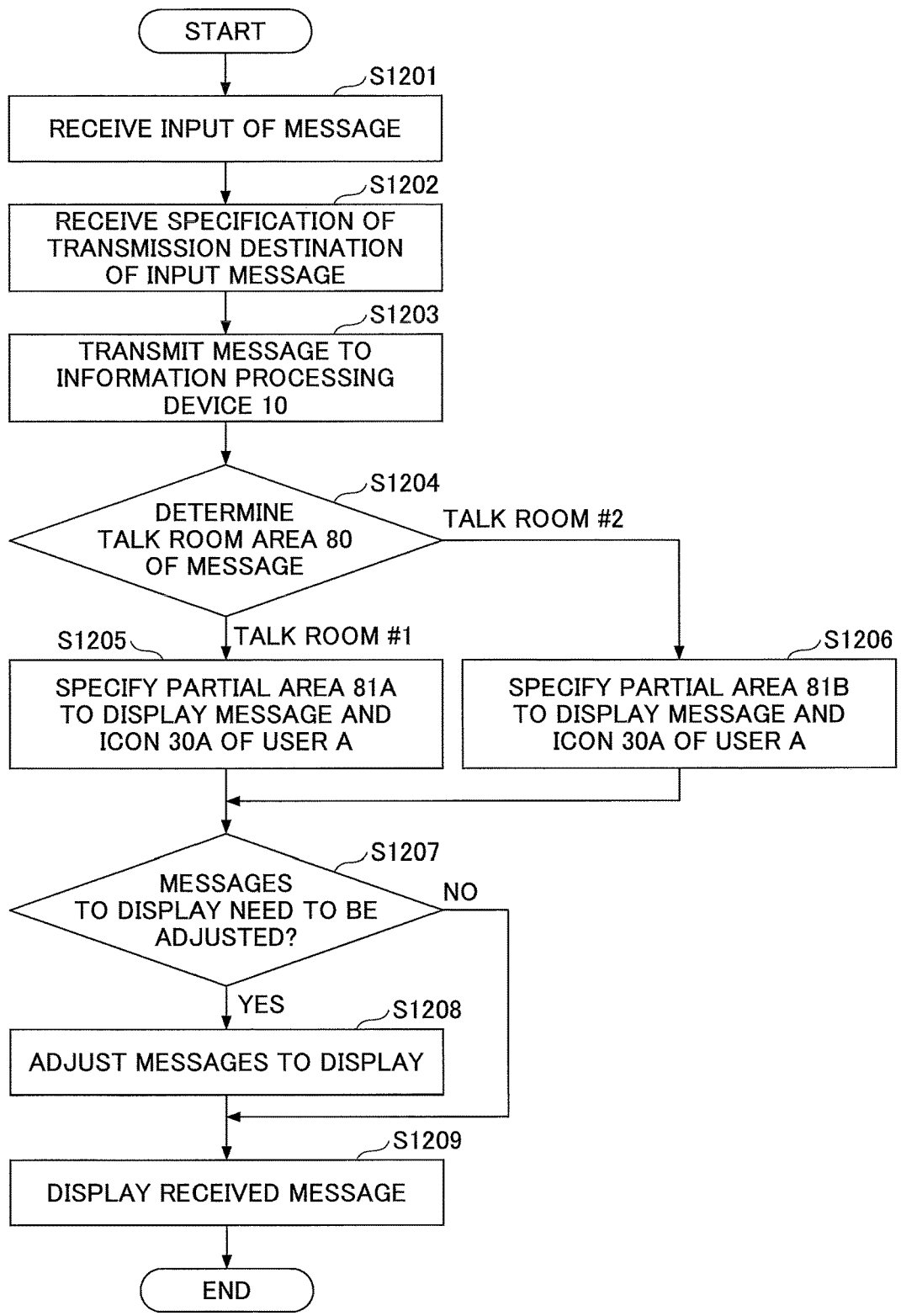
FIG. 12 is a flowchart of an operation (third example) according to the embodiment.

FIG. 12 is a flowchart of an operation when the terminal 20A of the user A receives an instruction to transmit a message from the user A. When the operation in FIG. 12 is performed, it is assumed that the first talk room area 80A to display talk room #1 and the second talk room area 80B to display talk room #2 are set on the screen of the terminal 20A of the user A and that the user A and the user B belong to talk room #1 and the user A and the user C belong to talk room #2.

In step S1201, the reception unit 220 receives an input of a message from the user A of the terminal 20A.

In step S1202, the reception unit 220 receives specification of a recipient of the input message from the user A of the terminal 20A. The input control unit 245 may determine that transmission of the message to talk room #1 is received if the first talk room area 80A is selected by a tapping operation or the like or may determine that transmission of the message to talk room #2 is received if the second talk room area 80B is selected by a tapping operation or the like.

In step S1203, the input control unit 245 sends an instruction, to the communication control unit 210, to transmit the message to the information processing device 10. For a destination of the message, the talk room specified as the destination or a user specified as the recipient is set. The communication control unit 210 transmits the message to the information processing device 10.

In step S1204, the display control unit 243 refers to the display setting table 250A to determine the talk room area 80 of the message input from the user A. If the recipient of the message is user B, namely, if the message is posted to talk room #1, the process proceeds to step S1205. In contrast, if the recipient of the message is the user C, namely, if the message is posted to talk room #2, the process proceeds to step S1206.

In step S1205, the display control unit 243 refers to the display setting table 250A to specify the partial area 81A where the message and the icon 30A of the user A are displayed and to determine a location where the message is displayed within the partial area 81A. This message and the icon 30A are displayed in the location within the partial area 81A, the location being positioned at a distance of a predetermined length in a downward direction from the last transmitted and received message in talk room #1. The icon 30A is displayed in the overlapping area 82.

In step S1206, the display control unit 243 refers to the display setting table 250A to determine a location where the message transmitted by the user A and the icon 30A of the user A are displayed in the same manner as in step S1205. This message and the icon 30A are displayed in the location within the partial area 81B, the location being positioned at a distance of a predetermined length in a downward direction from the last transmitted and received message in talk room #2. The icon 30A is displayed in the overlapping area 82.

Because steps S1207 to S1209 are the same as steps S1105 to S1107, descriptions thereof are omitted.

[Variation 1]

In the above embodiment, the drag-and-drop operation of the transmission menu 75 (Send) is received and the method for determining a recipient of a message input to the reception unit 220 is described with reference to FIG. 5B. There are various methods for determining a recipient of a message other than the methods shown in FIGS. 5A to 5C.

In the following, a method for determining a recipient of a message is described with reference to FIGS. 13A to 13F.

Figure 13A:
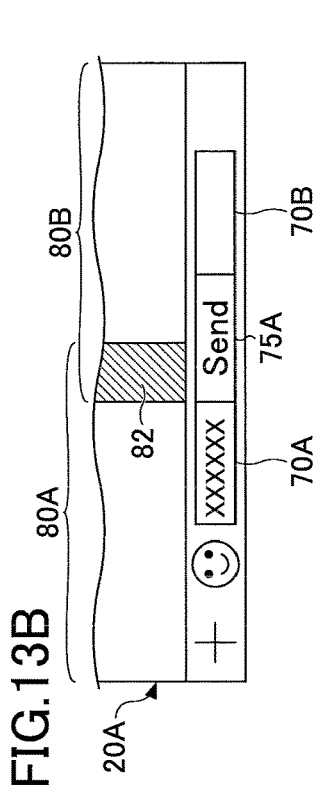
FIG. 13A is a diagram depicting a method (second example) for determining a recipient of a message according to the embodiment.

If the reception unit 220 receives selection of an input field 70A at a lower part of the first talk room area 80A, the input control unit 245 may determine that a message addressed to a talk room being displayed in the first talk room area 80A is going to be input. If the reception unit 220 receives selection of an input field 70B at a lower part of the second talk room area 80B, the input control unit 245 may determine that a message for a talk room being displayed in the second talk room area 80B is going to be input. FIG. 13A shows that the input field 70A is selected by tapping (50G) or the like by the user. In response to reception of the tapping, the input control unit 245 determines that a message for the talk room being displayed in the first talk room area 80A is going to be input.

In order for the user of the terminal 20 to be readily recognize a talk room selected as a destination of the message, the display control unit 243 may change display of the screen of the terminal 20A when the reception unit 220 receives selection of the destination of the message.

Figure 13B:
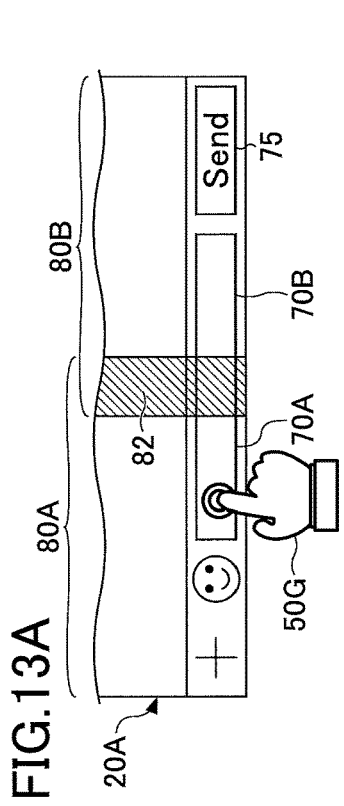
FIG. 13B is a diagram depicting a method (second example) for determining a recipient of a message according to the embodiment.

FIG. 13B shows that if a message for the talk room being displayed in the first talk room area 80A is input, the location of a transmission menu 75A (Send) is changed. When the reception unit 220 receives selection of the talk room being displayed in the first talk room area 80A, the display control unit 243 displays the transmission menu 75A (Send) at a lower part of the first talk room area 80A.

Figure 13C:
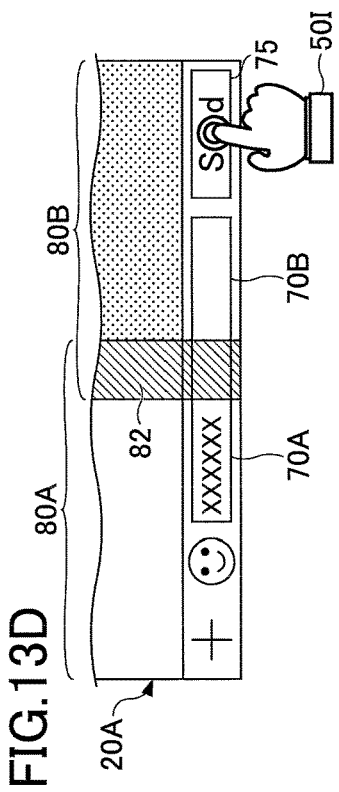
FIG. 13C is a diagram depicting a method (second example) for determining a recipient of a message according to the embodiment.

FIG. 13C shows that if a message for the talk room being displayed in the first talk room area 80A is input, a sign 76 is displayed in the first talk room area 80A. When the transmission menu 75 (Send) is selected by tapping (50H) or the like, the message is displayed in the first talk room area 80A.

Figure 13D:
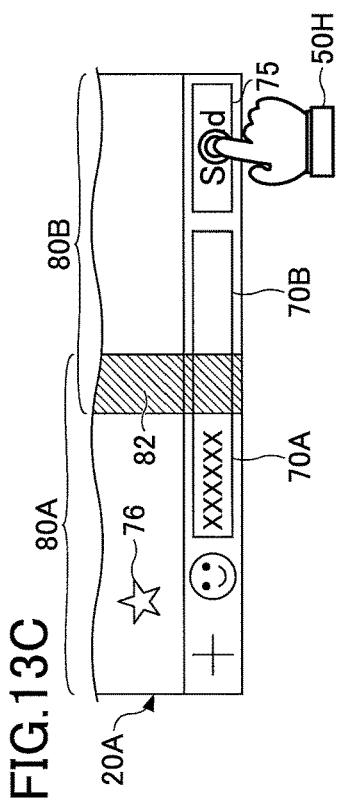
FIG. 13D is a diagram depicting a method (second example) for determining a recipient of a message according to the embodiment.

FIG. 13D shows that if a message for the talk room being displayed in the first talk room area 80A is input, the second talk room area 80B is grayed out. When the transmission menu 75 is selected by tapping (50I) or the like, the message is displayed in the first talk room area 80A.

While the destination is selected before the message is input in FIGS. 13A to 13D, the reception unit 220 may receive selection of the destination of the message from the user after the input of the message is completed.

Figure 13E:
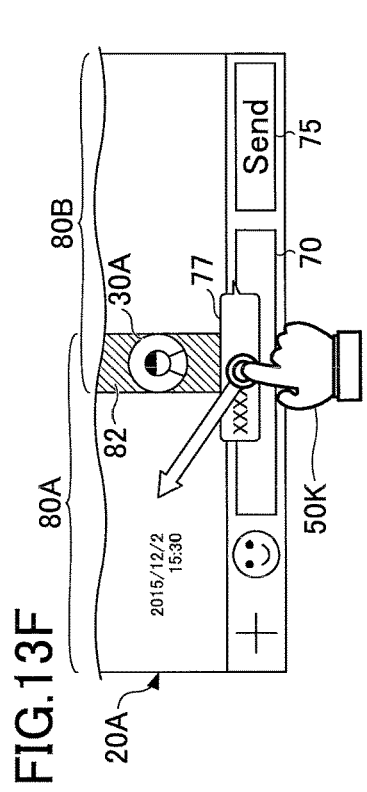
FIG. 13E is a diagram depicting a method (second example) for determining a recipient of a message according to the embodiment.

FIG. 13E shows that the icon 30B of the user B and the icon 30C of the user C are displayed as candidates for a recipient of a message in the vicinity of the input field 70. If the reception unit 220 receives tapping (50J) or the like on the icon 30B after the message is input, the input control unit 245 determines that the input message is addressed to the user B.

Figure 13F:
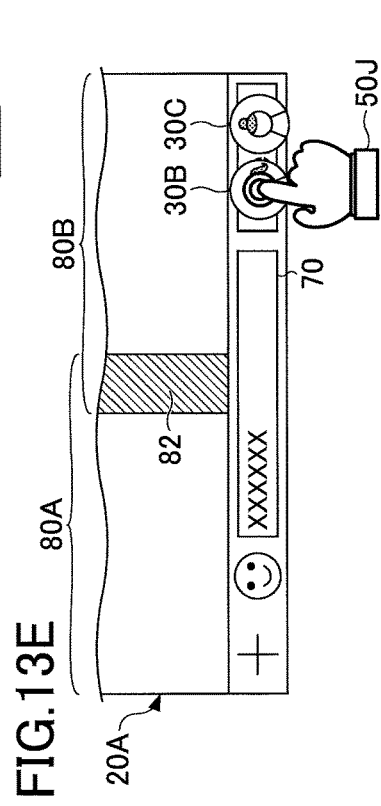
FIG. 13F is a diagram depicting a method (second example) for determining a recipient of a message according to the embodiment.

FIG. 13F shows that if the reception unit 220 receives an input of a message and the transmission menu 75 (Send) is selected, the message contents 77 are displayed on the screen of the terminal 20A in a movable manner by an operation such as dragging. When the reception unit 220 receives selection of the message being displayed and a drag-and-drop operation (50K) on the message, the display control unit 243 displays the message contents 77 in the talk room area 80 to which the message contents 77 are moved. In other words, the input control unit 245 determines that the message is for the talk room being displayed in the talk room area 80 to which the message contents 77 are moved.

[Variation 2]

In the above embodiment, the screen of the terminal 20 is divided in a longitudinal direction to display a plurality of talk rooms. However, it is possible to use various methods for displaying the talk room. A method for displaying talk rooms is described with reference to FIG. 14. FIG. 14 shows that four talk rooms are displayed on the screen of the terminal 20A of the user A.

In an upper part of the screen of the terminal 20A, a first talk room area 80A1 displays talk room #1 to which the user A and the user B belong, and a second talk room area 80B1 displays talk room #2 to which the user A and the user C belong. The first talk room area 80A1 and the second talk room area 80B1 include an overlapping area 821 and the icon 30A of the user A is displayed in the overlapping area 821. Further, in a lower part of the screen of the terminal 20A, a third talk room area 80A2 displays talk room #3 to which the user A and the user D belong, and a fourth talk room area 80B2 displays talk room #4 to which the user A and the user E belong. The third talk room area 80A2 and the fourth talk room area 80B2 include an overlapping area 822 and the icon 30A of the user A is displayed in the overlapping area 822. The same time sequence is used in the talk room areas 80. Messages transmitted and received in a predetermined period T4 are displayed on the screen of the terminal 20A. In FIG. 14, messages transmitted and received in one day from 23:00 on Dec. 1, 2015 to 23:00 on Dec. 2, 2015 are displayed.

As shown in FIG. 14, if the reception unit 220 receives a sliding operation (90) in the fourth talk room area 80B2 and the display control unit 243 changes messages to display in the fourth talk room area 80B2, messages to display are changed in the same manner in the other talk rooms 80. In this case, the transmission and reception period of messages to display in each talk room area 80 is the same.

[Variation 3]

Figure 15:
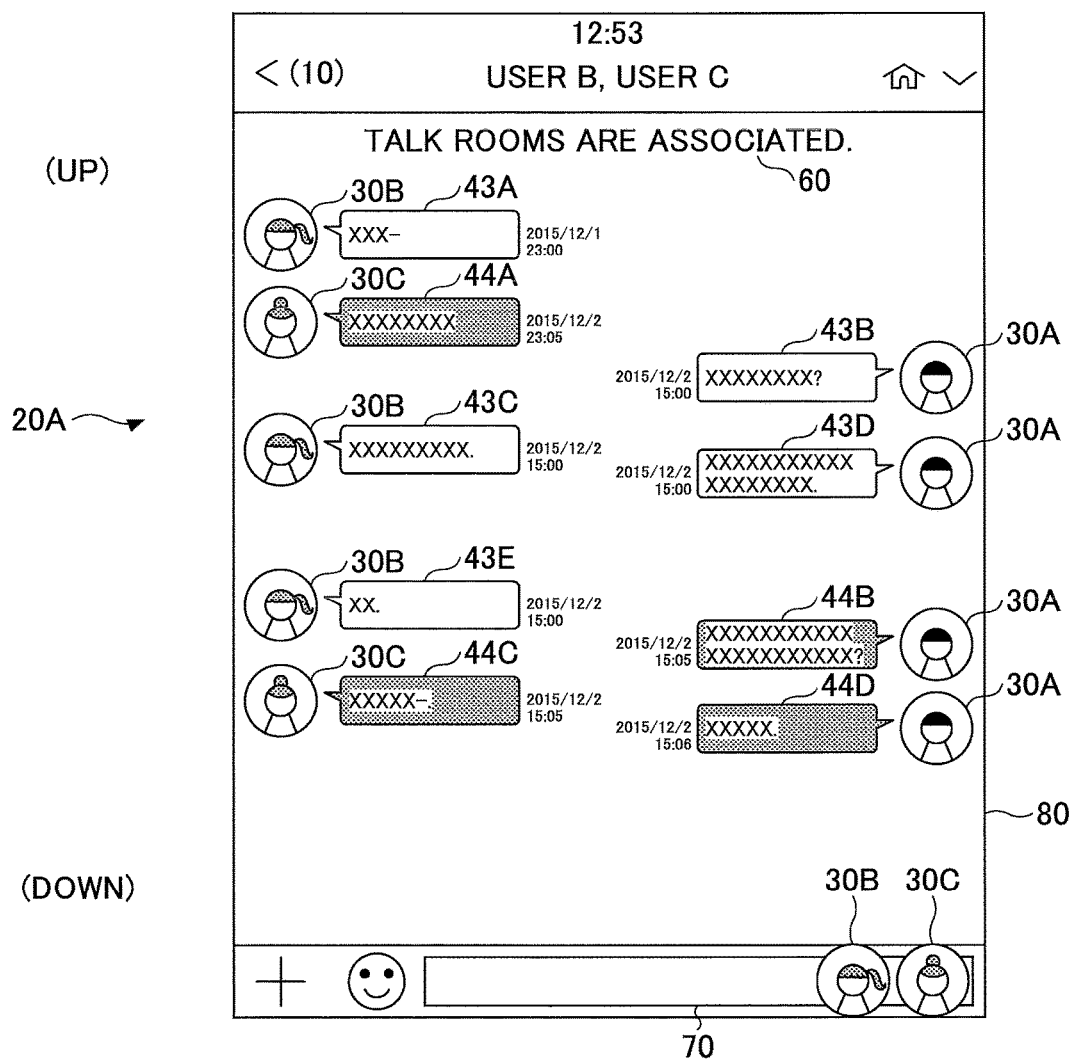
FIG. 15 is a diagram depicting display (fourth example) of a plurality of talk rooms according to the embodiment.

In the above embodiment, the talk room area 80 is disposed for each talk room. However, a plurality of talk rooms may be integrated and displayed in the same talk room area 80. The talk rooms displayed in the same talk room area 80 are described with reference to FIG. 15. FIG. 15 shows that talk room #1 and talk room #2 are simultaneously displayed in the talk room area 80 on the screen of the terminal 20A of the user A. On the screen, the sign 60 "talk rooms are associated" is displayed. The user A and the user B belong to talk room #1 and the user A and the user C belong to talk room #2.

In FIG. 15, designs of messages 43 in talk room #1 and messages 44 in talk room #2 are changed such that the user A of the terminal 20A may recognize the talk room in which relevant messages are exchanged. In this case, by changing a display form of messages or the icon 30, it is possible to allow the user to recognize the talk room in which relevant messages are exchanged. For example, a background color may be set or a frame of messages may be changed for each talk room. In this case, the display setting table 250A stores the display form of the messages and the icon 30. The display control unit 243 refers to the display setting table 250A, specifies the display form of the messages and the icon 30, and displays the messages in the specified display form on the screen. Further, when the reception unit 220 receives selection of the icon 30 after receiving an input of a message, the input control unit 245 may specify a destination of the message.

[Variation 4]

In the following, a process to change a destination of a transmitted message is described with reference to FIGS. 16A and 16B. According to the terminal 20 in the embodiment, it is possible to change a talk room to which the message is to be transmitted when a plurality of talk rooms are simultaneously displayed. In accordance with this, it is possible to change a destination of the message if the talk room is erroneously selected as the destination of the message.

Figure 16A:
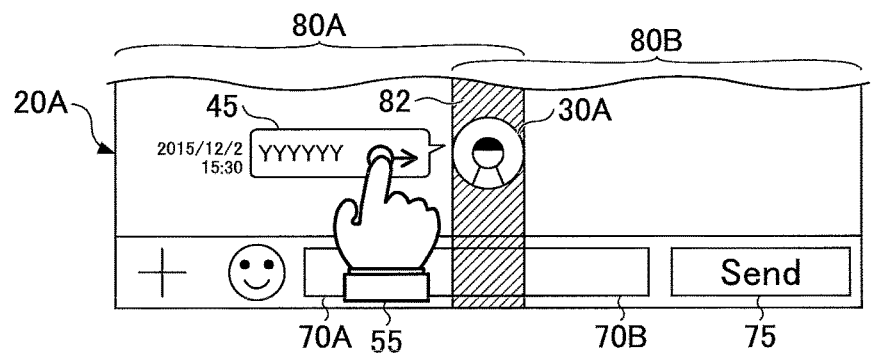
FIG. 16A is a diagram depicting a process to change a destination of a message according to the embodiment.
Figure 16B:
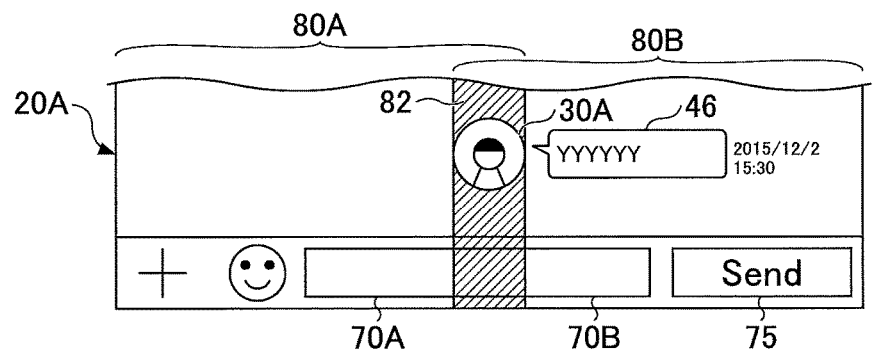
FIG. 16B is a diagram depicting a process to change a destination of a message according to the embodiment.

FIG. 16A shows that a message 45 is displayed in the first talk room area 80A for talk room #1 on the terminal 20A of the user A. In this case, it is assumed that the user A and the user B belong to talk room #1, the user A and the user C belong to talk room #2, and the message 45 is displayed as a message from the terminal 20A of the user A to the user B as shown in FIG. 16A.

If the reception unit 220 receives a swiping operation 55 toward the second talk room area 80B from the user A, the input control unit 245 determines that an instruction to switch the first talk room area 80A of the message 45 to the second talk room area 80B for the talk room #2 is received from the user A.

The display control unit 243 changes information stored in the message storing table 250B. Specifically, the message 45 is deleted from the message storing table 250B of talk room #1 and a message 46 having the same content is added to the message storing table 250B of talk room #2. In this case, the sender of the message 46 is the user A and the recipient of the message is user C.

Then the input control unit 245 instructs the communication control unit 210 to transmit, to the information processing device 10, a request to delete the message 45 from the terminal 20B of the user B. Further, the input control unit 245 instructs the communication control unit 210 to transmit the message 46 to the information processing device 10. The communication control unit 210 transmits the request for deletion to the information processing device 10 and transmits the message 46 to the information processing device 10.

The display control unit 243 deletes the message 45 from the first talk room area 80A and displays the message 46 in the second talk room area 80B. FIG. 16B shows that the message 46 is displayed in the second talk room area 80B of the terminal 20.

The information processing device 10 deletes the message 45 from the talk room #1 and adds the message 46 to talk room #2 in the same manner as in terminal 20A. Then the information processing device 10 sends an instruction to delete the message 45 to the terminal 20B and transmits the message 46 to the terminal 20C.

Further, when the reception unit 220 receives a predetermined operation on a message being displayed in the first talk room area 80A, the message being transmitted by the user A, the display control unit 243 may perform control to display the message in the second talk room area 80B too. This message is displayed in the second talk room area 80B of the screen of the terminal 20A.

As described above, according to the terminal 20 of the embodiment, while a plurality of talk rooms are simultaneously displayed, it is possible to change or add a destination of a transmitted message.

Further, when the reception unit 220 receives a predetermined operation on a message being displayed in the first talk room area 80A, the message being transmitted from the user B to the user A, the display control unit 243 may perform control to display the message in the second talk room area 80B too. In this case, the display control unit 243 sends, to the information processing device 10 via the communication control unit 210, an instruction to transmit the message to the terminal 20C of the user C. When the instruction is received, the information processing device 10 transmits the message to the terminal 20C of the user C. When the terminal 20C receives the message, the message is displayed on the screen of the terminal 20C as made by the user B and sent by the user A. In addition, the person who made the message is specified by the terminal 20A or the information processing device 10 from metadata or information included in the message.

[Variation 5]

In the following, transition of the screen of the terminal 20A from display of a plurality of talk rooms to a normal display state is described with reference to FIGS. 17 and 18.

As shown in FIG. 17, while a plurality of talk rooms are displayed, if the reception unit 220 receives a swiping operation 95, the display of the screen of the terminal 20A may be changed from the display of the talk rooms to the normal display state. In FIG. 17, because the second talk room area 80B for talk room #2 is selected and the swiping operation 95 is performed, the display control unit 243 displays talk room #2 on the screen of the terminal 20A in response to this swiping operation 95. In this case, talk room #1 simultaneously being displayed is deleted from the screen of the terminal 20A.

Figure 18:
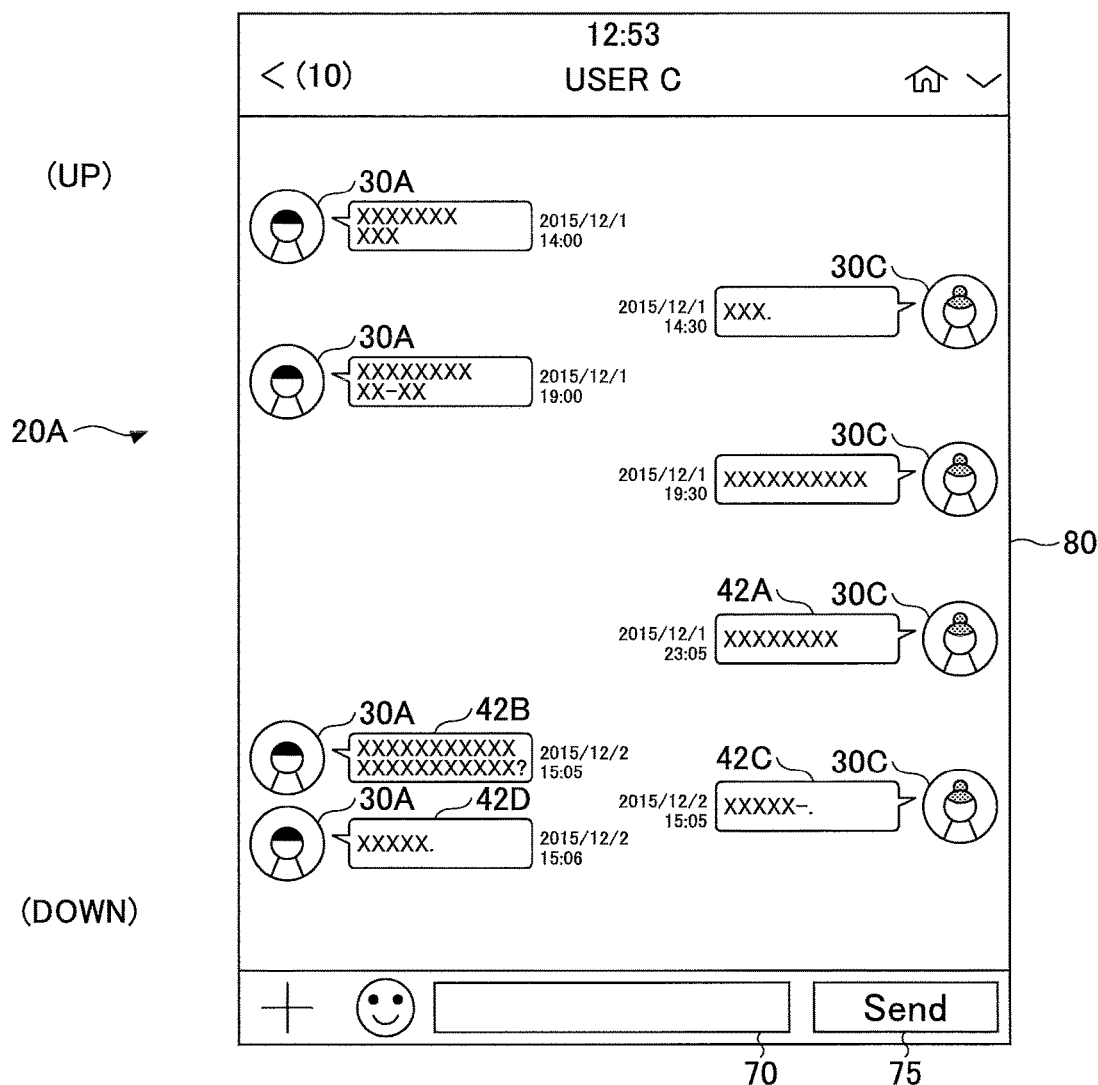
FIG. 18 is a diagram depicting a screen transition (second example) at a terminal according to the embodiment.

FIG. 18 shows that talk room #2 is displayed in the normal display state in the terminal 20A. The user A and the user C belong to talk room #2. Because of the cancellation of the display of the plurality of talk rooms, there is no need to adjust display periods of messages with another talk room. The display control unit 243 refers to the message storing table 250B of talk room #2 and displays messages together with the icons 30C of the user C as the sender on the screen of the terminal 20A. In this case, because there is no need to adjust the display periods of messages with another talk room, the display control unit 243 displays the messages on the screen based on the size of the screen of the terminal 20A, for example. Further, the display control unit 243 deletes information about talk room #1 and talk room #2 from the display setting table 250A.

As described above, according to the terminal 20 of the embodiment, it is possible to change display of the screen of the terminal 20 from the display of the talk rooms to the normal display state where necessary. Further, depending on the display state of the screen, it is possible to adjust display periods.

[Variation 6]

In the above embodiment, a plurality of talk rooms are associated with each other and displayed on the terminal 20A of the user A. This association may be shared among the terminal 20B of the user B and the terminal 20C of the user C.

Specifically, in step S1001 of FIG. 10, if the input control unit 245 of the terminal 20A determines that the reception unit 220 receives an instruction to display talk room #1 and talk room #2 on the screen of the terminal 20A from the user A of the terminal 20A, a request for approval of sharing talk room #1 and talk room #2 with another user is transmitted to the terminal 20B of the user B included in talk room #1 and to the terminal 20C of the user C included in talk room #2. In this case, the user C is reported to the terminal 20B of the user B and the user B is reported to the terminal 20C of the user C as the other user.

If the information processing device 10 receives approval from the terminal 20B of the user B and the terminal 20C of the user C, the information processing device 10 reports the context of talk room #2 to the terminal 20B of the user B in addition to the context of talk room #1 and reports the context of talk room #1 to the terminal 20C of the user C in addition to the context of talk room #2. Then, each of the display control units 243 in the terminal 20B of the user B and the terminal 20C of the user C associates talk room #1 with talk room #2 and displays talk room #1 and talk room #2 in the same manner as in the screen displayed on the terminal 20A. In accordance with this, the user B and the user C can confirm the context of another talk room from their own terminal 20.

In this case, each terminal 20 may display transmitted messages and received messages in different display forms. For example, the display control units 243 of the terminal 20B of the user B and the terminal 20C of the user C may highlight messages transmitted by its own terminal 20 and display the highlighted messages on the screen of the terminal 20.

[Variation 7]

Figure 19:
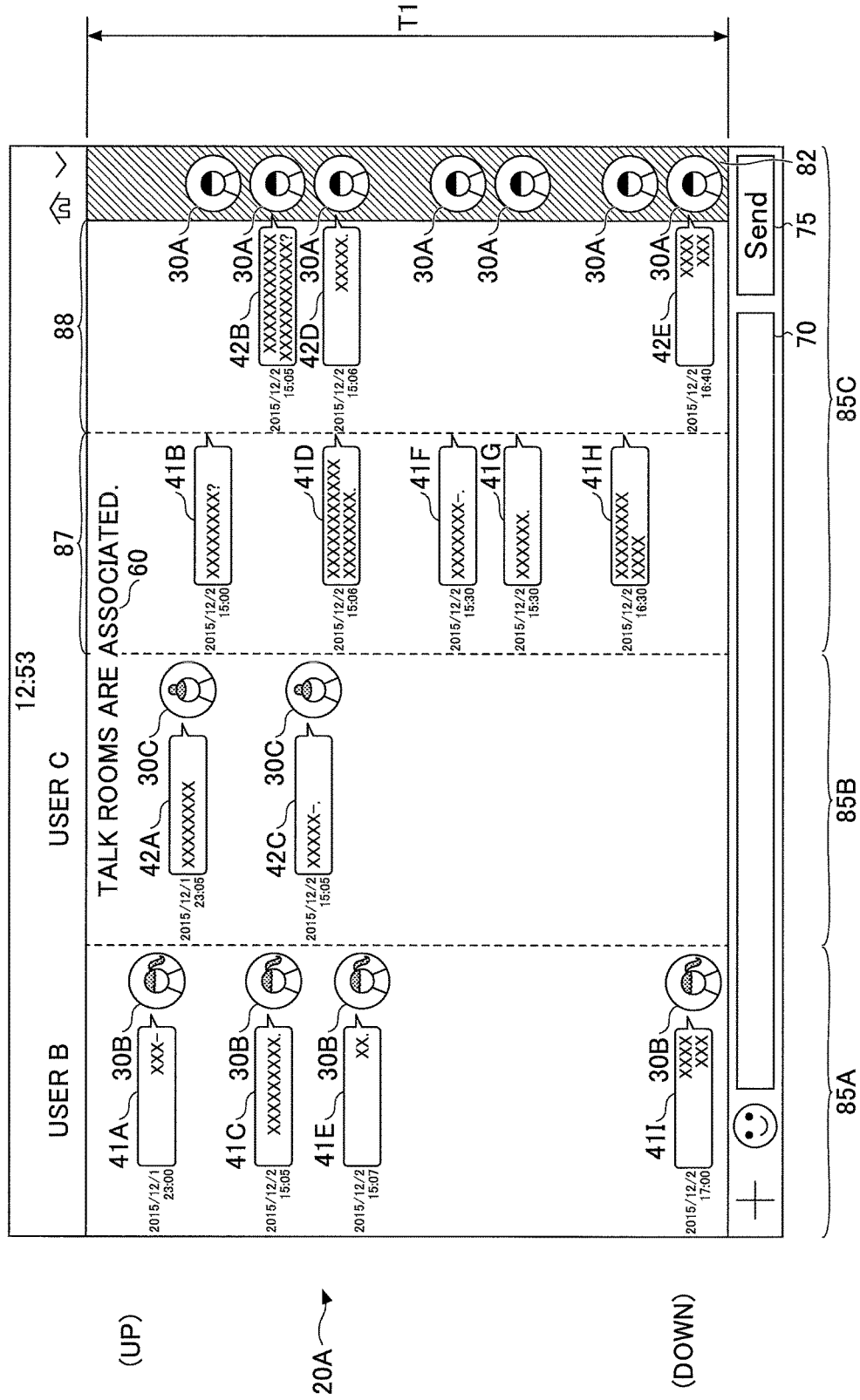
FIG. 19 is a diagram depicting display (fifth example) of a plurality of talk rooms according to the embodiment.

In the above embodiment, the third display area 85C is disposed between the first display area 85A and the second display area 85B. However, the third display area 85C may not be displayed in a central part of the screen. The third display area 85C may be set in a right side or in a left side of the screen of the terminal 20A. FIG. 19 shows display of the screen of the terminal 20 where the third display area 85C is set in the right side of the screen. Further, the overlapping area 82 where the icons 30A of the user A are displayed may be set in any place within the third display area 85C. For example, the overlapping area 82 may be set on a right end of the third display area 85C as shown in FIG. 19.

Further, the terminal 20A of the user A may only display messages transmitted by the terminal 20A without displaying the icon 30A of the user A. This is because the messages transmitted from the terminal 20A may be recognized by the user A without the icon 30A to identify the user A.

[Others] A computer-readable storage medium storing a computer-readable program of software to implement functions of the above embodiment may be provided to the terminal 20. The above embodiment is achieved when the terminal 20 reads out the program stored in the storage medium and executes the program as a matter of course. In this case, the computer-readable storage medium stores a computer-readable program that causes the terminal 20 to perform the above display control method.

Specifically, a non-transitory computer-readable storage medium storing a computer-readable program that, when executed by a first terminal of a first user, causes the first terminal of the first user to perform a process including: receiving an instruction to display first talk information and second talk information on a screen of the first terminal, the first talk information including data transmitted and received between the first terminal of the first user and a second terminal of a second user, the second talk information including data transmitted and received between the first terminal of the first user and a third terminal of a third user; displaying, in a first display area of the screen, transmission data of the second user included in the first talk information; displaying, in a second display area of the screen, transmission data of the third user included in the second talk information, the second display area being different from the first display area; and displaying, in a third display area of the screen, transmission data of the first user included in the first talk information and in the second talk information, the third display area being different from the first display area and the second display area, in which pieces of the transmission data of the first to third users included in the first talk information and the second talk information are displayed and spatially arranged in the first to third display areas in a single time sequence.

The program per se read out from the storage medium implements functions in the above embodiment.

Further, the functions in the above embodiment are not merely implemented when a computer device executes the readout program. An operating system (OS) or the like operating on the computer device may perform a part of or the entirety of an actual process in accordance with an instruction of the program. Further, the functions of the above embodiment may be implemented by the process as a matter of course.

While the preferred embodiment is described, the present invention is not limited to this embodiment. Various types of variations and replacements may be added without departing from the scope of the present invention.

According to the embodiment of the present invention, it is possible to associate messages transmitted and received between a plurality of destinations and to display the messages.

Further, the present invention is not limited to these embodiments, and various variations and modifications may be made without departing from the scope of the present invention.

The present application is based on and claims the benefit of priority of Japanese Priority Application No. 2015-246590 filed on Dec. 17, 2015, the entire contents of which are hereby incorporated by reference.

What is claimed is:

1. A display control method performed by a first terminal of a first user, the display control method comprising:
   receiving, using one or more processors, an instruction to display first message information and second message information on a screen of the first terminal, the first message information including data transmitted and received between the first terminal of the first user and a second terminal of a second user, the second message information including data transmitted and received between the first terminal of the first user and a third terminal of a third user;
   displaying, in a first display area of the screen, transmission data of the second user included in the first message information using the one or more processors;
   displaying, in a second display area of the screen, transmission data of the third user included in the second message information using the one or more processors, the second display area being different from the first display area; and
   displaying, in a third display area of the screen, transmission data of the first user included in the first message information and in the second message information using the one or more processors, the third display area being different from the first display area and the second display area, the third display area being between the first display area and the second display area; wherein
   the transmission data of the first user, the transmission data of the second user, and the transmission data of the third user are displayed in a single time sequence.

2. The display control method as claimed in claim 1, wherein in the third display area, the transmission data of the first user included in the first message information and the transmission data of the first user included in the second message information are displayed in corresponding areas different from each other.

3. The display control method as claimed in claim 2, wherein when the first terminal of the first user transmits new transmission data, or when the first terminal of the first user receives new transmission data from the second terminal of the second user or the third terminal of the third user, location of the transmission data of the first user, location of the transmission data of the second user, and location of the transmission data of the third user are changed in the single time sequence using the one or more processors.

4. The display control method as claimed in claim 2, wherein when the first terminal of the first user receives an operation to change display on the first display area, location of the transmission data of the first user, location of the transmission data of the second user, and location of the transmission data of the third user are changed in the single time sequence using the one or more processors.

5. The display control method as claimed in claim 1, further comprising:
   receiving input of transmission data into an input area using the one or more processors; and
   receiving specification of a destination of the transmission data using the one or more processors.

6. The display control method as claimed in claim 1, wherein the transmission data of the first user is displayed with user identification information for identifying the first user of the first terminal, the transmission data of the second user is displayed with user identification information for identifying the second user of the second terminal, or the transmission data of the third user is displayed with user identification information for identifying the third user of the third terminal.

7. The display control method as claimed in claim 1, further comprising:
   displaying user identification information for identifying the first user in the third display area.

8. A non-transitory computer-readable storage medium storing a computer-readable program that, when executed by a first terminal of a first user, causes the first terminal of the first user to perform a process, the process comprising:
- receiving an instruction to display first message information and second message information on a screen of the first terminal, the first message information including data transmitted and received between the first terminal of the first user and a second terminal of a second user, the second message information including data transmitted and received between the first terminal of the first user and a third terminal of a third user;
- displaying, in a first display area of the screen, transmission data of the second user included in the first message information;
- displaying, in a second display area of the screen, transmission data of the third user included in the second message information, the second display area being different from the first display area; and
- displaying, in a third display area of the screen, transmission data of the first user included in the first message information and in the second message information, the third display area being different from the first display area and the second display area, the third display area being between the first display area and the second display area, wherein
- the transmission data of the first user, the transmission data of the second user, and the transmission data of the third user are displayed in a single time sequence.

9. A first terminal of a first user, the first terminal comprising:
- one or more processors configured to receive an instruction to display first message information and second message information on a screen of the first terminal, the first message information including data transmitted and received between the first terminal of the first user and a second terminal of a second user, the second message information including data transmitted and received between the first terminal of the first user and a third terminal of a third user; and
- a display configured to display, in a first display area of the screen, transmission data of the second user included in the first message information, to display, in a second display area of the screen, transmission data of the third user included in the second message information, the second display area being different from the first display area, and to display, in a third display area of the screen, transmission data of the first user included in the first message information and in the second message information, the third display area being different from the first display area and the second display area, the third display area being between the first display area and the second display area, wherein
- the transmission data of the first user, the transmission data of the second user, and the transmission data of the third user are displayed in a single time sequence.

* * * * *